US012675713B2

(12) United States Patent
Chajewska et al.

(10) Patent No.: US 12,675,713 B2
(45) Date of Patent: Jul. 7, 2026

(54) DOMAIN EXPLORATION USING SPARSE GRAPHS

(71) Applicant: Microsoft Technology Licensing, LLC, Redmond, WA (US)

(72) Inventors: Urszula Stefania Chajewska, Issaquah, WA (US); Harsh Shrivastava, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1044 days.

(21) Appl. No.: 17/853,626

(22) Filed: Jun. 29, 2022

(65) Prior Publication Data

US 2024/0005181 A1 Jan. 4, 2024

(51) Int. Cl.
*G06N 5/04* (2023.01)
(52) U.S. Cl.
CPC ...................................... *G06N 5/04* (2013.01)
(58) Field of Classification Search
CPC ....................................................... G06N 5/04
See application file for complete search history.

(56) References Cited

U.S. PATENT DOCUMENTS

| | | | |
|---|---|---|---|
| 7,644,052 B1 | 1/2010 | Chang et al. | |
| 2010/0104186 A1* | 4/2010 | Grady ..................... | G06T 7/143 |
| | | | 382/173 |
| 2014/0317736 A1* | 10/2014 | Cao ..................... | H04L 63/1483 |
| | | | 726/23 |
| 2016/0299975 A1* | 10/2016 | Acar ...................... | G06N 5/022 |
| 2019/0096007 A1* | 3/2019 | Xie ......................... | G06Q 10/40 |
| 2019/0392396 A1* | 12/2019 | Liu .................... | G06F 16/90332 |
| 2021/0103807 A1* | 4/2021 | Baker .................. | G06N 3/0985 |
| 2022/0138004 A1 | 5/2022 | Nandakumar | |
| 2023/0360310 A1* | 11/2023 | Guerrero ................. | G06T 15/04 |
| 2024/0007414 A1* | 1/2024 | Jain .......................... | G06F 9/505 |

FOREIGN PATENT DOCUMENTS

WO 2015179632 A1 11/2015

OTHER PUBLICATIONS

"International Search Report and Written Opinion Issued in PCT Application No. PCT/US23/022798", Mailed Date: Sep. 14, 2023, 14 Pages.

(Continued)

*Primary Examiner* — Courtney Harmon
(74) *Attorney, Agent, or Firm* — Ray Quinney & Nebeker P.C.; Christopher K. Hallstrom

(57) ABSTRACT

The present disclosure relates to systems, methods, and computer-readable media for utilizing a network graph exploration system to facilitate improved exploration of network graphs via inferencing and improved visualization. For example, the network graph exploration system utilizes inferencing to accurately facilitate question and answer explorations, impute missing data in data sets, and perform accurate evaluations. Additionally, in various implementations, the network graph exploration system compresses large, busy, complex, and unreadable network graphs into smaller structures that offer better readability while preserving the primary properties and structure of the domain of a network graph.

20 Claims, 12 Drawing Sheets

(56) References Cited

OTHER PUBLICATIONS

Aluru, et al., "EnGRaiN: A Supervised Ensemble Learning Method for Recovery of Large-Scale Gene Regulatory Networks", In Journal of Bioinformatics, vol. 38, Issue 5, Dec. 9, 2021, pp. 1312-1319.

Applegate, et al., "Sampling and Integration of Near Log-Concave Functions", In Proceedings of the Twenty-Third Annual ACM Symposium on Theory of Computing, May 5, 1991, pp. 156-163.

Belilovsky, et al., "Learning to Discover Sparse Graphical Models", In Proceedings of the 34th International Conference on Machine Learning, Aug. 6, 2017, 9 Pages.

Chajewska, et al., "Learning an Agent's Utility Function by Observing Behavior", In Proceedings of the Eighteenth International Conference on Machine Learning, Jun. 28, 2001, 8 Pages.

Friedman, et al., "Sparse Inverse Covariance Estimation with the Graphical Lasso", In Journal of Biostatistics, vol. 9, Issue 3, Dec. 12, 2007, pp. 432-441.

Hallac, et al., "Network Inference via the Time-Varying Graphical Lasso", In Proceedings of the 23rd ACM SIGKDD International Conference on Knowledge Discovery and Data Mining, Aug. 13, 2017, pp. 205-213.

Heckerman, David, "A Tutorial on Learning with Bayesian Networks", In Technical Report MSR-TR-95-06, Nov. 1996, 58 Pages.

Heckerman, et al., "Toward Normative Expert Systems: Part I The Pathfinder Project", In Journal of Methods of Information in Medicine, vol. 31, Issue 2, Jun. 1992, 33 Pages.

Heckerman, et al., "Toward Normative Expert Systems: Part II Probability-Based Representations for Efficient Knowledge Acquisition and Inference", In Journal of Methods of Information in Medicine, vol. 31, Issue 2, Jul. 1992, pp. 106-116.

Koller, et al., "Probabilistic Graphical Models: Principles and Techniques", In Publication of the MIT Press, Jul. 2009, 1270 Pages.

Moerman, et al., "GRNBoost2 and Arboreto: Efficient and Scalable Inference of Gene Regulatory Networks", In Journal of Bioinformatics, vol. 35, Issue 12, Nov. 15, 2018, pp. 2159-2161.

Pearl, Judea, "Probabilistic Reasoning in Intelligent Systems: Networks of Plausible Inference", In Publication of Morgan Kaufmann, Sep. 1988, 573 Pages.

Pratapa, et al., "Benchmarking Algorithms for Gene Regulatory Network Inference from Single-Cell Transcriptomic Data", In Journal of Nature Methods, vol. 17, Issue 2, Feb. 2020, pp. 147-154.

Ravikumar, et al., "High-Dimensional Covariance Estimation by Minimizing $\ell$1-Penalized Log-Determinant Divergence", In Electronic Journal of Statistics, vol. 5, Jan. 2011, pp. 935-980.

Shrivastava, et al., "GLAD: Learning Sparse Graph Recovery", In Repository of arXiv:1906.00271v1, Jun. 1, 2019, 14 Pages.

Shrivastava, et al., "GRNUlar: Gene Regulatory Network Ceconstruction using Unrolled Algorithm from Single Cell RNA-Sequencing Data", In Publication of Biorxiv, Apr. 23, 2020, 10 Pages.

Shrivastava, et al., "uGLAD: Sparse Graph Recovery by Optimizing Deep Unrolled Networks", In Repository of arXiv:2205.11610v1, May 23, 2022, 17 Pages.

Yu, et al., "DAG-GNN: DAG Structure Learning with Graph Neural Networks", In Proceedings of the 36th International Conference on Machine Learning, Jun. 9, 2019, 10 Pages.

Zheng, et al., "DAGs with No Tears: Smooth Optimization for Structure Learning", In Repository of arXiv:1803.01422v1, Mar. 4, 2018, 14 Pages.

* cited by examiner

Pre-Modified Value Conditions *510a*

Post-Modified Value Conditions *510b*

Uncompressed Network Graph _610a_

Compressed Network Graph _610b_

700

Providing A Graph Generated From A Precision Matrix Derived From A Dataset 710

Receiving A Modified Value Condition Of A Target Node 720

Determining Updated Values Based On The Modified Value Condition 730

Providing An Updated Network Graph With The Updated Expected Values 740

Compressing Multiple Nodes In The Graph 750

800

Memory 803

Instructions 805

Data 807

Processor 801

Communication Interface(s) 809

819

Input Device(s) 811

Output Device(s) 813

Display Device 815

Display Controller 817

DOMAIN EXPLORATION USING SPARSE GRAPHS

BACKGROUND

Recent years have seen significant advancements in both hardware and software with respect to accessing, managing, and sharing digital content. For instance, modern computing systems allow researchers and other individuals to identify, access, and utilize large collections of digital content. Indeed, modern computing systems provide the processing power, memory, and connectivity needed to process large collections of digital content, such as generating and providing network graphs that show relationships between elements (e.g., nodes) using links (e.g., edges). Indeed, a network graph can serve as an important tool to understand massive data in a compressed manner.

Despite these and other advances, existing computing systems face several technical shortcomings that result in inaccurate and inflexible operations, particularly in the area of data set exploration using network graphs (e.g., visually exploring large data sets). To elaborate, despite massive data sets becoming more common, few tools exist for unrestricted domain exploration. As a result, in many instances, these large data sets are poorly understood. Indeed, while some existing computing systems provide the ability to generate network graphs, these conventional systems are rigidly limited in their ability to provide exploration functionality and tools.

As noted above, existing computer systems are inadequate and inflexible. For example, many existing computer systems utilize machine-learning tools to predict outcomes based on large data sets. Specifically, most of these machine-learning tools are oriented toward predicting a particular outcome variable with respect to selected input variables. However, these and other systems provide no information regarding relationships between most other variables in the data set, which are inaccurately ignored. Additionally, existing machine-learning models require large data sets and do not accurately work with small and complex data sets.

As another example, many existing computer systems that utilize unsupervised learning models are unable to accurately evaluate the quality and veracity of their operations. For example, because unsupervised learning methods are very difficult to evaluate, existing computer systems run evaluations using synthetic data, where the underlying distribution used to generate the data is known and can be compared to those learned by the model. While such results are helpful, these models cannot be evaluated with real-world data, which may present distributions that are very different from any used in synthetic experiments. Accordingly, even though many existing computer systems provide some tools for data exploration, the accuracy of these tools cannot be evaluated or trusted.

As an additional example, existing computer systems can struggle when large data sets include more features than observations. In particular, many existing computer systems employ models that use mathematical functions that do not work when the number of features exceeds the number of observations. Indeed, existing computer systems can use models and tools that are unable to process these types of data sets.

As provided above, existing computer systems are commonly inflexible. For example, many existing computer systems are unable to provide useful results for sparse data sets. In particular, due to either incompleteness or overcomplexity, many computer systems generate unreadable visual network graphs that fail to provide useful information. Additionally, many existing computer systems inflexibly lack tools to correct these errors let alone allow for the efficient exploration of visual network graphs. As another example, many existing computing systems provide poor user interfaces for working with data sets and exploring network graphs.

These and other problems result in significant inaccuracies and inflexibilities of existing computing systems with respect to graph data set exploration.

BRIEF DESCRIPTION OF THE DRAWINGS

The detailed description provides one or more implementations with additional specificity and detail through the use of the accompanying drawings, as briefly described below.

DETAILED DESCRIPTION

Figure 1A:
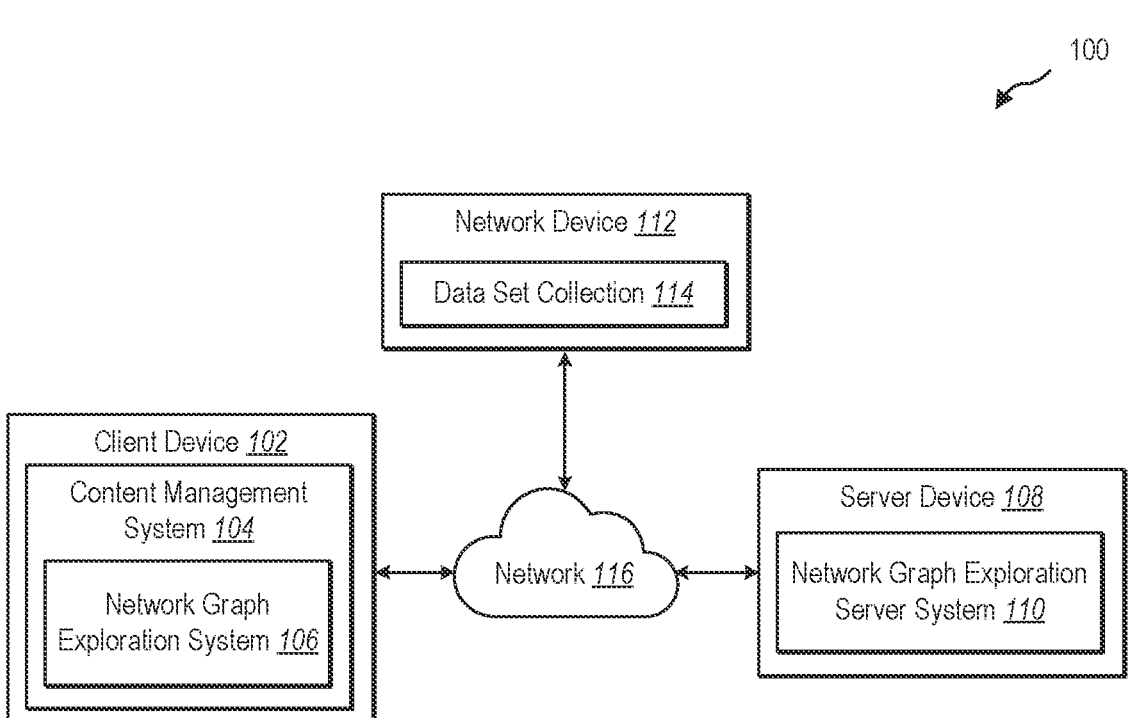
FIGS. 1A-1B illustrate a diagram of a computing system environment where a network graph exploration system is implemented in accordance with one or more implementations.

Implementations of the present disclosure provide benefits and/or solve one or more of the foregoing or other problems in the art with systems, non-transitory computer-readable media, and methods utilizing a network graph exploration system to facilitate improved exploration of network graphs via inferencing and improved visualization. For example, the network graph exploration system utilizes inferencing to accurately facilitate question and answer explorations, impute missing data in data sets, and perform accurate evaluations. Additionally, in various implementations, the network graph exploration system compresses large, busy, complex, and unreadable network graphs into smaller structures that offer better readability while preserving the primary properties and structure of the domain of a network graph.

By way of context, probabilistic graphical models (PGMs) are generative models that can reveal the structure of a domain of a complex system via a network graph by visually showing dependencies between a random set of variables. For example, network graphs indicate conditional dependence between two variables (e.g., visually shown as nodes) that are directly connected via an edge connection. PGMs have been used in various domains, including medical diagnosis, fault diagnosis, analysis of genomic data via gene regulatory networks, speech recognition, and financial applications. PGMs, however, suffer from problems when attempting to recover the structure from high-dimension observational data, which is particularly difficult (e.g., when the number of features may be larger than the number of observations). Accordingly, the network graph exploration system addresses these and other issues of current PGMs to facilitate improved network graph exploration.

Additionally, the network graph exploration system can utilize a deep-learning sparse graph recovery model to recover sparse network graphs. For example, in various implementations, the network graph exploration system utilizes a sparse graph recovery model to generate a parameterized graph structure derived from a feature-rich data set of observations based on solving a variation of graphical lasso (i.e., least absolute shrinkage and selection operator) objective function. The network graph exploration system can then generate and display a network graph of the domain based on the parameterized graph structure.

Once a network graph is generated, the network graph exploration system can improve upon it utilizing inferencing and visualization methods, as described below. For example, in one or more implementations, the network graph exploration system provides a network graph within a graphical user interface where the network graph is generated from a data set utilizing a deep-learning sparse graph recovery model. Additionally, the network graph exploration system can receive input modifying a value condition of a value of a target node from the set of nodes as well as determine, for a subset of nodes that are connected (directly by an edge or indirectly by a sequence of edges) to the target node, updated expected values based on the modified value condition and the parameterized graph structure. Further, the network graph exploration system can update the graphical user interface to provide an updated network graph that includes the subset of nodes with the updated expected values.

Additionally, or in the alternative, the network graph exploration system determines that a network graph is unclear and/or unreadable. For example, the network graph exploration system can determine that a graph complexity metric of the network graph exceeds a network graph complexity threshold and, in response, compresses multiple nodes from the set of nodes in the network graph. Further, the network graph exploration system can combine a subset of nodes into combined nodes until the network graph complexity threshold is no longer exceeded.

As described herein, the interactive graphing system provides several technical benefits in terms of computing accuracy, flexibility, and efficiency compared to existing computing systems. Indeed, the interactive graphing system provides several practical applications that deliver benefits and/or solve problems associated with graph data set exploration and, in particular, with respect to inferencing and visualization.

To illustrate, in various implementations, the interactive graphing system improves accuracy and flexibility by utilizing inferencing and querying to facilitate interactive graph exploration, such as enabling a user to provide flexible questions and receive accurate answers over network graphs. For instance, the network graph exploration system enables one or more variables to be modified with value conditions (e.g., questions) and, in response, the network graph exploration system determines (e.g., answers) how other variables in the network graph will be affected. Indeed, the network graph exploration system provides graph exploration of variables beyond the select few offered by existing computer systems.

As another example, the network graph exploration system improves accuracy by uncovering and correcting data flaws and gaps in sparse data sets. As noted above, existing computer systems rely primarily on prediction tools and models. However, these prediction tools and models primarily work when a data set is free of flaws and gaps. Accordingly, the network graph exploration system can remedy these issues before prediction tools can be employed to ensure their usefulness. Additionally, in correcting data flaws and gaps in sample data, the network graph exploration system can also guide additional data collection.

Similarly, the network graph exploration system improves accuracy by correctly evaluating models and operations associated with network graph exploration. As noted above, existing computer systems struggle to evaluate unsupervised learning models due to various issues. Some existing computer systems attempt to overcome this shortcoming by evaluating models using synthetic data. In contrast, the network graph exploration system utilizes real-world data and real-world distributions for evaluations. For example, the network graph exploration system can improve a data set by accurately imputing missing values in a manner that aligns with actual values present in observational data. Then, utilizing these modified data sets, the network graph exploration system can evaluate the real-world data utilizing standard regression evaluation metrics to obtain highly-accurate model evaluations.

Further, many existing computer systems utilize imputation algorithms that have been shown to often have undesirable properties. In contrast, in various implementations, the network graph exploration system utilizes a probability distribution learned from complete observations to impute these values with more accuracy. As a result, the network graph exploration system can achieve improved accuracy over existing computer systems.

Furthermore, in various implementations, the network graph exploration system provides increased flexibility over existing computing systems. For instance, the network graph exploration system provides an interactive interface that allows users to provide different inputs, such as values, constraints, ranges, and conditions to modify one or more variables. In response, the network graph exploration system utilizes a parameterized graph structure and probability distributions of each variable to automatically determine and display updated expected values for each variable.

As another example, while existing computer systems often fail to provide any solution to understand large data sets that are poorly visually represented, the network graph exploration system can flexibly provide several solutions. For example, the network graph exploration system can dynamically compress a portion of a network graph to improve the readability of variables and comprehension of a domain. For instance, the network graph exploration system can create a hypernode by merging cliques and/or connected components to reduce the clutter and complexity of an oversaturated network graph.

In various implementations, the network graph exploration system provides an interactive interface that saves users multiple navigational steps by providing an all-in-one user interface, which saves computing resources and reduces the number of steps needed to arrive at and/or visualize relevant concept relationships. Thus, unlike most existing computing systems that require multiple tools, numerous manual operations, and large amounts of computer processing to generate a visual network graph, the network graph exploration system efficiency facilitates these actions with minimal user interaction.

As illustrated in the foregoing discussion, the present disclosure utilizes a variety of terms to describe the features and advantages of one or more implementations described herein. For instance, the term "network graph" (or "parametrized network graph") refers to a data structure that indicates relationships between elements. For example, a network graph includes network nodes (i.e., elements, variables, concepts, features) connected by network edges (or simply edges) that represent how the network nodes (or simply nodes) interconnect. Nodes can be connected directly (i.e., via a single edge) connected indirectly (i.e., via a sequence of edges and intermediary nodes). In some cases, one or more connected nodes are not connected (directly or indirectly) to another group of nodes in a network graph, such as a connected component. In some instances, a network graph includes positive and/or negative correlations between the nodes. Indeed, in various instances, a network graph encodes probabilistic conditional independence between variables/nodes (e.g., conditional independences can be different than mere correlations).

In many implementations, a network graph can be represented visually, such as within an interactive interface. In addition, a network graph can include different visual effects (e.g., colors, thicknesses, patterns, etc.) to show magnitudes of connection strength or other correlation scores between concepts, features, and/or variables. Examples of network graphs include knowledge graphs, multiplex graphs, heterogeneous graphs, hypergraphs, directed graphs, and/or undirected graphs. In some implementations, a network graph is maintained with a database or other storage medium as interconnected elements.

As used herein, the terms "parameterized graph structure," "network structure," or "parameterized graph" refer to a data structure that correlates concepts (e.g., elements, features, or variables) to other concepts within a data set (e.g., document collection). In various implementations, the parameterized graph structure is a concept-concept matrix that includes more than mere covariance between concepts but rather serves as an parameterized graph structure that includes latent correlations and encodes conditional independence relations between concepts in a document collection, as further provided below.

As used herein, the term "display value" refers to a value determined for a variable represented as a node of a network graph. In various implementations, a display value corresponds to the expected value of a variable that is based on the distribution over a given variable learned from data. In some implementations, a display value corresponds to an exact or observed value provided by a user. For example, a user substitutes an expected value of a target node with a modified value (e.g., a modified exact or observation value). In some implementations, display values represent MAP (maximum a-posteriori) estimates for all variables/nodes in the system.

As used herein, the term "machine learning" refers to methods that leverage data to improve performance on a set of tasks. For example, machine learning can include algorithms that generate data-driven predictions or decisions from the known input data as well as deep learning methods. Examples of machine-learning models include computer representations that are tunable (e.g., trainable) based on inputs to approximate unknown functions. For instance, a machine-learning model includes a model that utilizes algorithms to learn from, and make predictions on, known data by analyzing the known data to learn to generate outputs that reflect patterns and attributes of the known data. Machine-learning model can include supervised, semi-supervised, and unsupervised models. Additionally, machine-learning models include latent Dirichlet allocation (LDA), multi-arm bandits models, linear regression models, logistical regression models, random forest models, support vector machines (SVM) models, neural networks (convolutional neural networks, recurrent neural networks such as LSTMs, graph neural networks), clustering, density estimation, and masked language models, or decision tree models.

Additionally, a machine-learning model can include probabilistic graphical models (PGMs). For example, a machine-learning model can include a model to learn a PGM, including the domain structure (e.g., edges) as well as parametrization of that structure (which in some cases can be more complex than single number associated with each edge). An example of learnable PGM is a sparse graph recovery model. In various implementations, a sparse graph recovery machine-learning model that determines correlation strengths between pairs of concepts within a data set (e.g., a set or collection of digital documents). In some implementations, the sparse graph recovery machine-learning model is a neural network that includes multiple neural network layers. In various implementations, the sparse graph recovery machine-learning model includes a uGLAD model that solves a graphical least absolute shrinkage and selection operator (LASSO) problem.

Figure 1B:
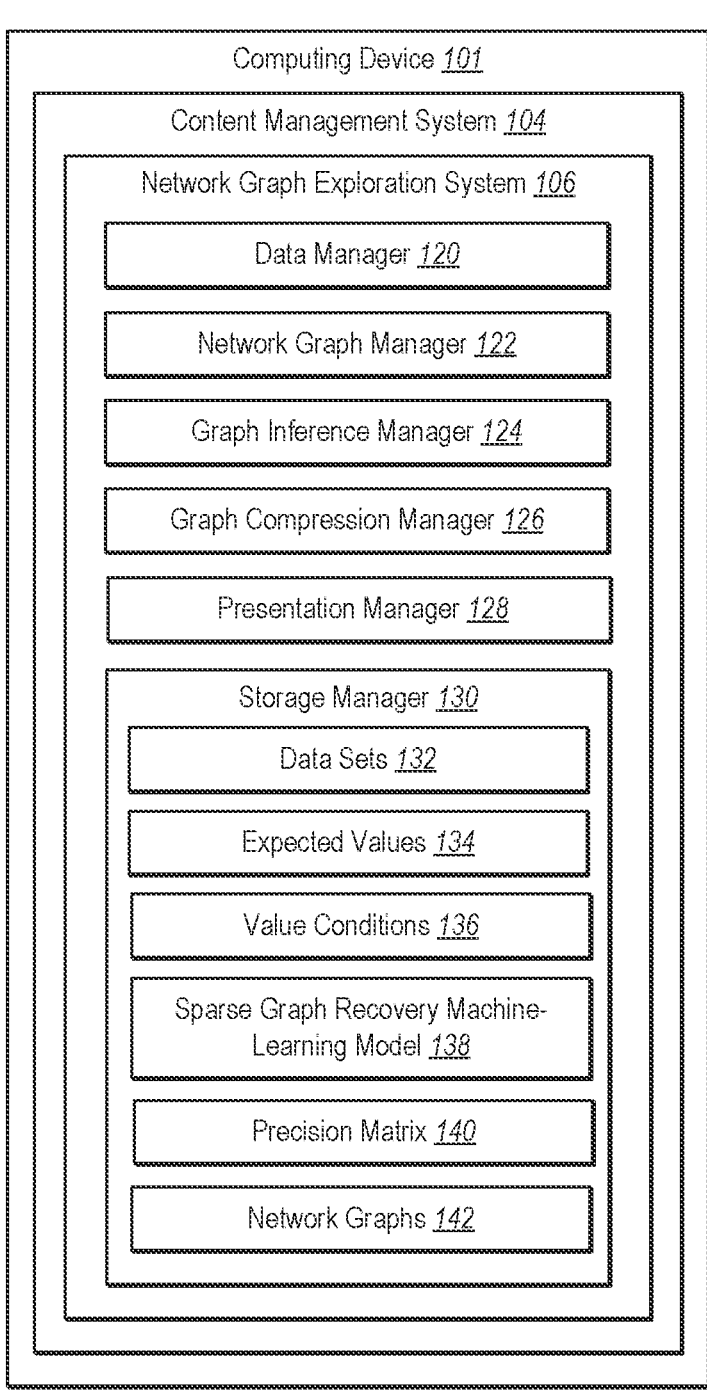

Additional detail will now be provided regarding the components and elements of the network graph exploration system. For example, FIGS. 1A-1B illustrate a schematic diagram of an environment 100 (i.e., a digital medium system environment) for implementing a network graph exploration system 106. In particular, FIG. 1A includes the environment 100 and FIG. 1B provides additional detail regarding components and elements of the network graph exploration system 106.

As shown in FIG. 1A, the environment 100 includes a client device 102, a server device 108, and a network device 112, which can communicate via a network 116. Additional detail regarding these and other computing devices is provided below in connection with FIG. 8. In addition, FIG. 8 also provides additional detail regarding networks, such as the network 116 shown.

In various implementations, the client device 102 is associated with a user (e.g., a user client device), such as a user that interacts with network graphs via the network graph exploration system 106. As shown, the client device 102 includes a content management system 104. In various implementations, the content management system 104 can perform a variety of functions, as provided below in connection with FIG. 1B.

As also shown, the content management system 104 includes a network graph exploration system 106. In various implementations, the network graph exploration system 106 generates network graphs from data sets. For example, the network graph exploration system 106 generates, within an interactive interface, a visualization of a network graph from a data set that is part of a data set collection 114 stored on the network device 112. Additional details and components of the network graph exploration system 106 are provided in FIG. 1B.

As just mentioned, the network device 112 includes the data set collection 114 In addition to storing collections of data sets, in one or more implementations, the data set collection 114 can generate, create, receive, obtain, encode, modify, store, transmit, share, or otherwise manage electronic data. In various implementations, the data set collection 114 is located across multiple network devices and/or network locations.

As shown, the environment 100 also includes the server device 108. The server device 108 includes a network graph exploration server system 110. For example, in one or more implementations, the network graph exploration server system 110 represents and/or provides similar functionality as described herein in connection with the network graph exploration system 106. In some implementations, the network graph exploration server system 110 supports the network graph exploration system 106 on the client device 102. Indeed, in one or more implementations, the server device 108 includes all, or a portion of, the network graph exploration system 106. For instance, the network graph exploration system 106 on the client device 102 downloads and/or accesses an application provided by the server device 108 (e.g., a graphing exploration program from the network graph exploration server system 110) or a portion of a software application.

In some implementations, the network graph exploration server system 110 includes a web hosting application that allows the client device 102 to interact with content and services hosted on the server device 108. To illustrate, in one or more implementations, the network graph exploration server system 110 implements the network graphing framework, which includes one or more network graphing machine-learning models. For example, the client device 102 (e.g., a mobile device) provides access to a data set (e.g., via a data management application) to the network graph exploration server system 110 on the server device 108, which provides a parameterized graph structure back to the client device 102, which the network graph exploration system 106 converts into a network graph.

Although FIG. 1A illustrates a particular number, type, and arrangement of components within the environment 100, various additional environment configurations and arrangements are possible. For instance, as shown by the dashed line, the client device 102 may optionally be connected to other computing devices. To elaborate, in some instances, once a dataset is loaded on the client device 102, the client device 102 operates the network graph exploration system 106 without being connected to a network. For example, the environment 100 includes any number of client devices. As another example, the server device 108 represents a set of connected server devices. As a further example, the client device 102 may communicate directly with the server device 108, bypassing the network 116 or utilizing a separate and/or an additional network.

As mentioned above, FIG. 1B provides additional detail regarding the capabilities and components of the network graph exploration system 106. To illustrate, FIG. 1B shows a computing device 101 having the content management system 104 and the network graph exploration system 106. For example, the computing device 101 represents either the client device 102 and/or the server device 108 introduced above.

As also mentioned above, the content management system 104 can perform a variety of functions. For example, in one or more implementations, the content management system 104 facilitates the distribution of various digital content items (e.g., observations, documents, etc.) across the network 116. In one or more implementations, the content management system 104 facilitates, identifies, receives, accesses, opens, loads, edits, modifies, moves, copies, shares, saves, removes, deletes, stores, downloads, transmits, and/or imports digital content items, including those that may be part of data sets 132.

As shown, the content management system 104 includes the network graph exploration system 106, which includes various components and elements. For example, the network graph exploration system 106 includes a data manager 120, a network graph manager 122, a graph inference manager 124, a graph compression manager 126, a presentation manager 128, and a storage manager 130. As also shown, the storage manager 130 can include data sets 132, expected values 134, a value conditions 136, a sparse graph recovery machine-learning model 138, a parameterized graph structure 140, and a network graphs 142.

As shown, the network graph exploration system 106 includes the data manager 120. In one or more implementations, the data manager 120 receives, accesses, provides, edits, modifies, identifies, creates, or otherwise manages the data sets 132. For example, the data manager 120 access documents from a data set collection of observed data, such as the data sets collection 114 on the network device 112. In various implementations, the data sets 132 include a sparse data set (e.g., where most of the entries are zero (i.e., 0) or another designated value) and/or a data set where the number of features may outnumber the number of observations.

As shown, the network graph exploration system 106 includes the network graph manager 122. In various implementations, the network graph manager 122 facilitates creating, modifying, storing, adding, removing, identifying, accessing, or otherwise managing network graphs 142. In various implementations, a network graph is generated from a parameterized graph structure 140 that is derived from a data set by the sparse graph recovery machine-learning model 138. In some implementations, the sparse graph recovery machine-learning model 138 is an unsupervised deep-learning sparse graph recovery model (referred to as "uGLAD") that solves the graphical lasso (i.e., least absolute shrinkage and selection operator) problem or a variation thereof. In various implementations, the network graph manager 122 determines and/or displays expected values 134 for nodes (e.g., elements or variables) within the network graphs 142.

As also shown, the network graph exploration system 106 includes the graph inference manager 124. In various implementations, the graph inference manager 124 facilitates, determines, generates, modifies, provides, or otherwise manages inferences to elements or variables in the network graphs 142. For example, the network graph exploration system 106 receives input that provides value conditions 136 for one or more target nodes. In response, the graph inference manager 124 generates updated expected values and/or updated distributions for surrounding nodes in the network graphs 142 and propagates these updates throughout the network. In various implementations, the graph inference manager 124 utilizes a parameterized graph structure 140 in connection with the value conditions 136 to generate updated versions of the network graphs 142. In many implementations, the graph inference manager 124 performs the interactive operations on-the-fly and/or in real time.

As shown, the network graph exploration system 106 includes the graph compression manager 126. In various implementations, the graph compression manager 126 compresses the network graphs 142 by combining two or more nodes into a combined node. In various implementations, the graph compression manager 126 combines nodes belonging to a clique (e.g., where all the nodes in a group are each connected to all other nodes in the group). In some implementations, the network graphs 142 combines a connect component (e.g., a set of two or more connected nodes where there is a path (a sequence of connections) between any two nodes, not connected to a larger group of nodes) into a combined node. In various implementations, the network graphs 142 determines that a graph complexity metric (e.g., the average number of connections per node in a network graph) in the network graph exceeds a network graph complexity threshold and, in response, compresses multiple nodes in the network graph until the network graph complexity threshold is no longer exceeded.

As also shown, the network graph exploration system 106 includes the presentation manager 128. In various implementations, the presentation manager 128 generates, identifies, edits, modifies, receives, accesses, provides, or otherwise manages network graphs 142. For example, in one or more implementations, the presentation manager 128 displays the network graphs 142. In some implementations, the presentation manager 128 applies visual effects to emphasize both positive and negative correlations between concepts in the network graphs 142. In some implementations, the presentation manager 128 provides a graphical user interface with which a user can explore and interact (e.g., an interactive interface).

Additionally, the network graph exploration system 106 includes the storage manager 130. In various implementations, the storage manager 130 can include any data used by any of the components of the network graph exploration system 106 in performing features and functionality described herein. For example, the storage manager 130 may include the data sets 132, the expected values 134, the value conditions 136, the sparse graph recovery machine-learning model 138, the parameterized graph structure 140, and the network graphs 142. Additionally, in connection with the above description, the network graph manager 122, the graph interface manager 124, and the graph compression manager 126 can provide, update, and access the data structures and values stored in storage manager 130.

Figure 2:
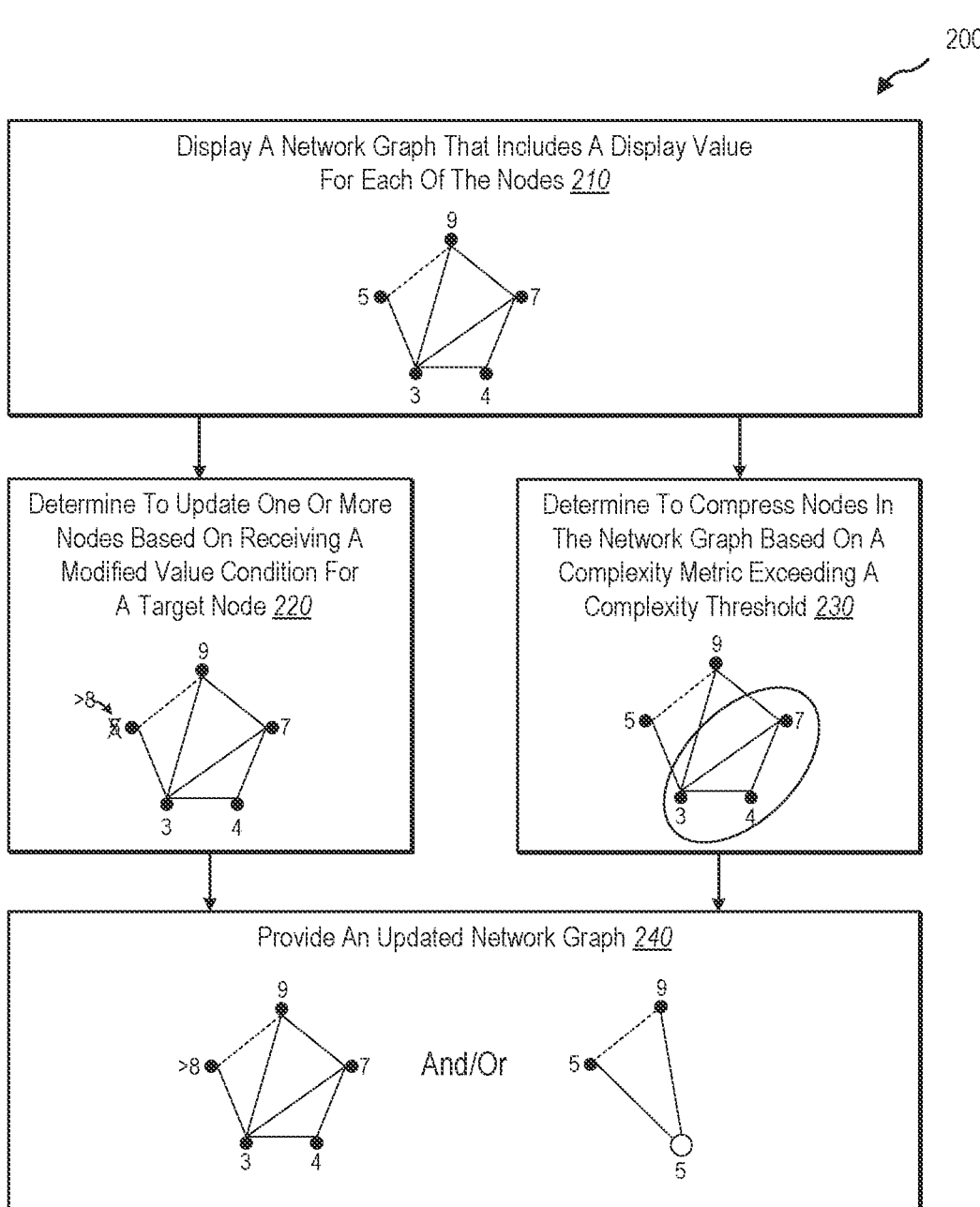
FIG. 2 illustrates an example overview for implementing network graph exploration tools in accordance with one or more implementations.

Additional detail in connection with an example implementation of the network graph exploration system 106 is discussed in connection with FIG. 2. For example, FIG. 2 illustrates an example overview for implementing network graph exploration tools in accordance with one or more implementations. As shown, FIG. 2 illustrates a series of acts 200, where one or more of the acts can be performed by the network graph exploration system 106 and/or a content management system.

As shown in FIG. 2, the series of acts 200 includes an act 210 of displaying a network graph that includes a display value for each of the nodes. For instance, in various implementations, the network graph exploration system 106 displays a set of nodes connected by edges, where nodes correspond to variables or elements in a data set. Additionally, within a network graph, connected nodes are related while nodes not connected to each other indicate conditional independence. More specifically, in some implementations, if two nodes in a network graph are not connected via an edge, it means that they are conditionally independent given all other nodes in the network graph.

Additionally, in various implementations, the network graph exploration system 106 can provide an expected value (e.g., steady-state value) of nodes. For example, the network graph exploration system 106 determines a probability distribution for a variable in a data set. From the probability distribution, the network graph exploration system 106 determines an expected value for the variable, which corresponds to a displayed node. In some instances, a network graph displays expected values for one or more nodes. In other instances, a network graph displays an observed or an expected value for a node based on user interaction (e.g., a click, hover, or settings toggle). Additional detail regarding displaying network graphs is provided below in connection with FIGS. 3A-3B.

In addition, FIG. 2 shows that the series of acts 200 includes an act 220 of determining to update one or more nodes based on receiving a modified value condition for a target node. For example, the network graph exploration system 106 provides an interactive interface where a user can interact with various nodes. In some implementations, the network graph exploration system 106 facilitates a user providing values or value conditions for one or more target nodes. For instance, the network graph exploration system 106 detects a user interacting with a target node by providing input that indicates an updated expected value or value condition (e.g., less than X or between X-Z).

As noted above, in various implementations, the network graph exploration system 106 computes the expected value or a steady-state value for a node when its exact value is unknown and the network graph exploration system 106 only has a distribution over possible values. When a user provides a value for a target node, the value of the node is no longer an expected value but is an exact or observed value (until the network graph or node value is reset). However, when a user provides a value conditional, the network graph exploration system 106 can generate a new expected or steady-state value, for example, based on an updated distribution over possible values that satisfies the value condition.

Further, in response to detecting a modified value condition for a target node, the network graph exploration system 106 utilizes the modified value condition to update other nodes in the network graph, which can include directly connected nodes as well as indirectly connected nodes. In this manner, as a user interacts with the network graph with different queries (e.g., questions), the network graph exploration system 106 can provide the user with updated network graphs that show how a change or a condition to a target node is reflected in other nodes of a network graph (e.g., answers). Additional detail for updating a network graph based on a modified condition to a target node is provided below in connection with FIGS. 5A-5C.

As also shown, the series of acts 200 includes an act 230 of determining to compress nodes in the network graph based on a complexity metric exceeding a complexity threshold. For example, in various implementations, the network graph exploration system 106 determines that a network graph is too busy or complex based on a complexity metric, such as the average number of connections per node. In various implementations, as long as the complexity metric for a network graph exceeds a network graph complexity threshold, the network graph exploration system 106 can compress groups of nodes in the graph (e.g., groups based on cliques or connected components). Additional detail regarding network graph compression is provided below in connection with FIGS. 6A-6C.

Further, the series of acts 200 includes an act 240 of providing an updated network graph. For instance, the network graph exploration system 106 displays an updated network graph that includes modified values (e.g., modified observed values, expected values or steady-state values) for nodes throughout the network graph (e.g., propagated out from the modified target node) based on implementing modified conditions. In various implementations, the network graph exploration system 106 displays a compressed network that is much more understandable and readable than the previous network graph.

Figure 3A:
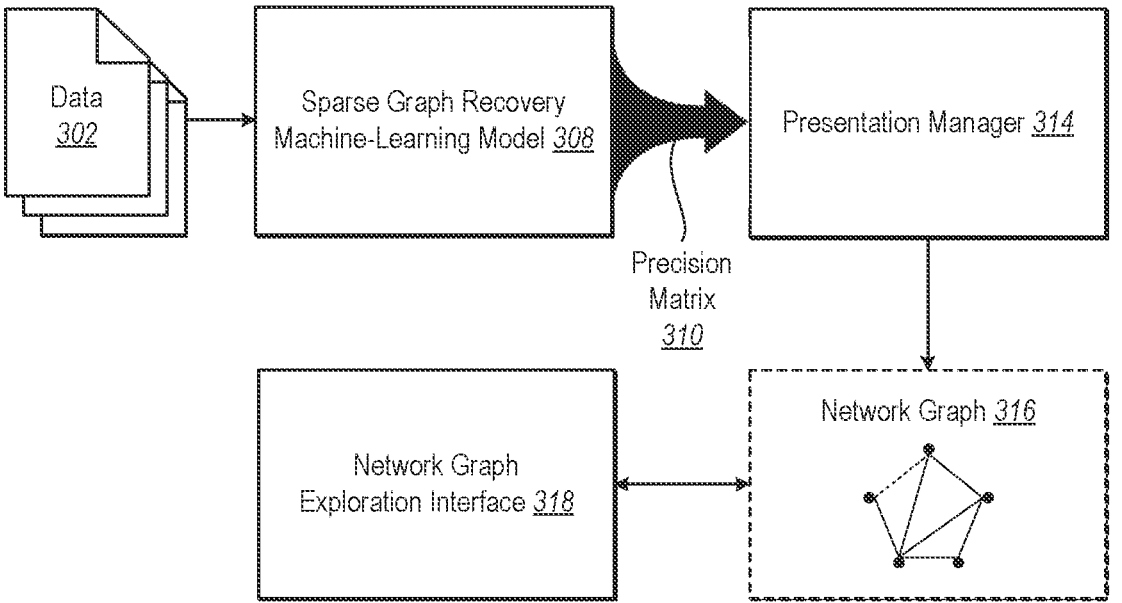
FIGS. 3A-3B illustrate a block diagram and interface that includes additional details for generating and providing a network graph for a data set in accordance with one or more implementations.
Figure 3B:
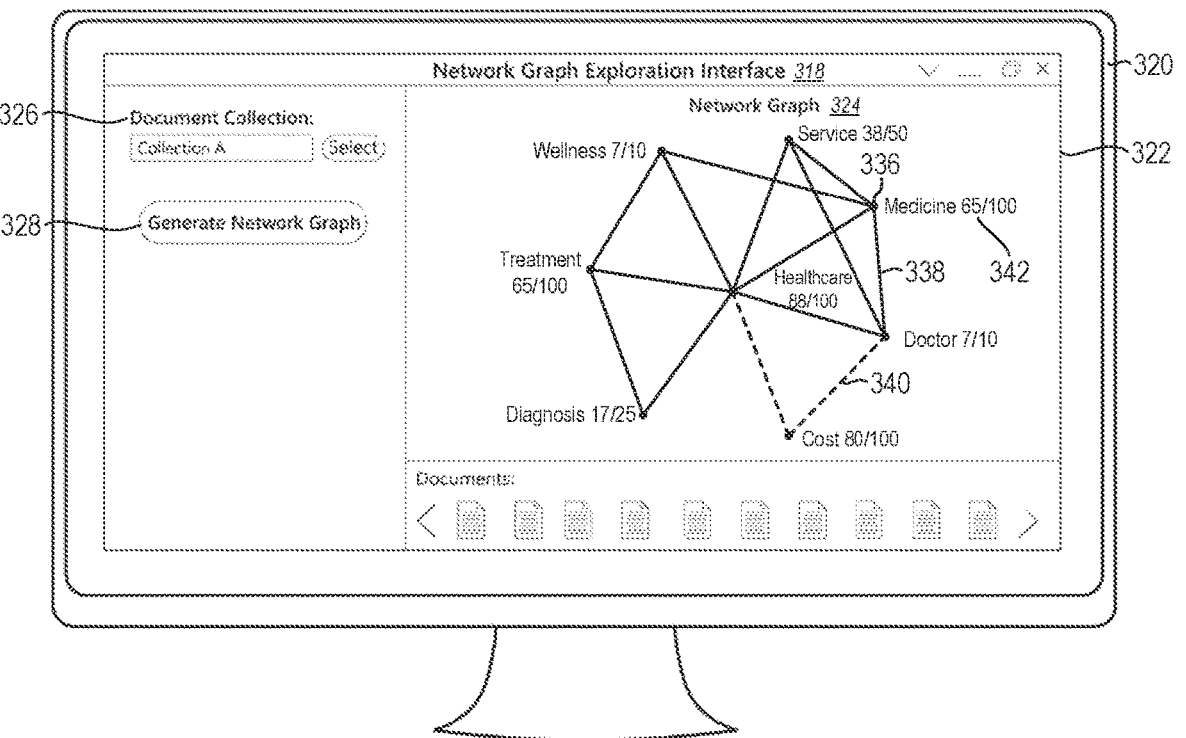

As noted above, FIGS. 3A-3B illustrate a block diagram and interface that includes additional details for generating and providing a network graph for a data set in accordance with one or more implementations. For instance, FIG. 3A shows various example components and elements corresponding to the network graph exploration system 106. FIG. 3B includes a graphical user interface for network graph exploration.

As shown, FIG. 3A includes data 302. In various implementations, the data 302 corresponds to observations in a data set. In some implementations, the data 302 corresponds to a set of documents (e.g., from a document collection). In some implementations, the data 302 corresponds to a topic, such as medicine, political discourse, public policies, digital media, news, research, and academia. In various implementations, the data 302 is part of a data set that also includes metadata indicating characteristics of the data set. The data 302 can range from a few entries of data to a large volume of millions of data entries.

As shown in FIG. 3A, the network graph exploration system 106 can provide the data 302 to the sparse graph recovery machine-learning model 308, which generates a parameterized graph structure 310. In various implementations, as part of providing the data 302 to the sparse graph recovery machine-learning model 308, the network graph exploration system 106 first processes the data 302. For instance, in various implementations, the network graph exploration system 106 generates a data-concept matrix (or any type of corpus-token relationship) from the data 302.

In various implementations, a data-concept matrix refers to a data structure that correlates observations in a data set with variables, features, or concepts in the data set. In some implementations, a data-concept matrix includes at least one row for each data observation entry (e.g., document) and at least one column for each concept. In these implementations, the intersection of an observation entry and a concept can be represented by a concept count value indicating the number of times the concept appears in the observation entry. Alternatively, the intersection of an observation entry and a concept can be represented by any aspect of the concept recorded during the observation.

As noted above, FIG. 3A also includes a sparse graph recovery machine-learning model 308. In various implementations, the network graph exploration system 106 utilizes the sparse graph recovery machine-learning model 308 to generate a parameterized graph structure 310 indicating concept-concept relationships. In various implementations, the sparse graph recovery machine-learning model 308 is an unsupervised deep-learning sparse graph recovery model (e.g., uGLAD) that solves the graphical lasso problem or a variation thereof. In some implementations, the sparse graph recovery machine-learning model 308 is another type of machine-learning model and/or neural network that addresses the sparse graph recovery problem.

In various implementations, the network graph exploration system 106 generates a network graph 316 from the parameterized graph structure 310. For example, the network graph exploration system 106 utilizes a presentation manager 314 (e.g., the same or similar to the presentation manager 128) to generate a network graph 316 from the parameterized graph structure 310.

In one or more implementations, the presentation manager 314 first supplements the parameterized graph structure 310 with visual features and effects. For instance, the network graph exploration system 106 can enhance the visual features and effects of the network graph. In various implementations, the presentation manager 314 can add labels, such as expected values and edge connection values (e.g., node correlation scores) to the network graph 316.

In various implementations, the presentation manager 314 determines which concepts in the parameterized graph structure 310 to map as nodes as well as their corresponding locations in the network graph 316. In various implementations, the presentation manager 314 can add visual features and effects based on visual thresholds. For instance, the network graph exploration system 106 utilizes a correspondence threshold to determine whether to add a concept correlation to a network graph. In some implementations, the network graph exploration system 106 utilizes the correspondence threshold to determine whether to add a concept connection or correlated concept pairing (e.g., a line) connecting the two concepts.

Then, upon generating a parameterized graph structure (including a modified, enhanced, and/or wrapped parameterized graph structure), the presentation manager 314 can convert it into a network graph 316. Further, the network graph exploration system 106 can display, or provide for display, the network graph 316 to a user via a computing device.

As shown, FIG. 3A includes a network graph exploration interface 318. In various implementations, the network graph exploration system 106 provides the network graph exploration interface 318 for a user to view the network graph 316 as well as interact and explore connections within the domain associated with the data 302. Additional detail regarding providing an interactive interface is described below in connection with FIG. 3B.

Before proceeding to the next figure, additional detail is provided regarding generating network graphs from observational data. In various implementations, it is assumed that the data holds a multivariate Gaussian distribution and the goal of the network graph exploration system 106 is to estimate a sparse inverse covariance matrix (i.e., the precision matrix). Further, in many implementations, a sparsity constraint is typically enforced by the use of $l_i$ (lasso) regularization.

To illustrate, given m observations of a d-dimensional multivariate Gaussian random variable $X=[X_1, \ldots, X_d]^T$, the sparse graph recovery problem aims to estimate its covariance matrix $\Sigma^*$ and precision matrix $\Theta^*=(\Sigma^*)^{-1}$. Additionally, the $ij^{th}$ component of $\Theta^*$ is zero if $X_i$ and $X_j$ are conditionally independent given the other variables $\{X_k\}_{k \neq i,j}$. In some instances, a $l_1$ regularization is imposed for the estimation of $\Theta^*$ to increase its sparsity, which can lead to clearer interpretable models. In some implementations, the problem is formulated as the $l_1$-regularized maximum likelihood estimation shown in Equation 1 below.

$$\hat{\Theta} = \arg\min_{\theta \in S_{++}^d} -\log(\det\Theta) + tr(\hat{\Sigma}\Theta) + \rho\|\Theta\|_{1,off} \quad (1)$$

In Equation 1, $\Sigma^*$ may represent the empirical covariance matrix based on m samples, $$S_{++}^d$$

may refer to the space of d×d symmetric positive definite matrices (SPD), and $\|\Theta\|_{1,off}=|\Theta_{ij}|$ may refer to the offdiagonal $l_1$ regularizer with regularization parameter $\rho$. In some instances, this estimator is sensible even for non-Gaussian X, since it is minimizing an $l_1$-penalized log-determinant Bregman divergence. Additionally, the sparse precision matrix estimation problem in Equation 1 may be a convex optimization problem that can be solved by multiple algorithms.

For instance, as noted above the network graph exploration system 106 can utilize a deep machine-learning model (e.g., uGLAD) to solve the sparse precision matrix estimation problem. For example, consider the input data of $X \in \mathbb{R}^{M \times D}$, where M is the number of samples and D is the dimension of each sample. As noted above, it is assumed that the data comes from an underlying multivariate Gaussian distribution, and the goal of the network graph exploration system 106 is to recover the sparse graph as a precision matrix. In these implementations, the uGLAD model takes in the input data and outputs a parameterized graph structure, $\Theta = f_{nn}(X)$. Additionally, $f_{nn}$ may represent the uGLAD model architecture. Further, the network graph exploration system 106 can utilize the graphical lasso objective as a loss function and optimize the $f_{nn}$ to minimize it and recover the underlying precision matrix.

In various implementations, the network graph exploration system 106 employs probabilistic reasoning over sparse network graphs. To illustrate, using the uGLAD model and optimizing the graphical lasso objective, the network graph exploration system 106 estimates a covariance matrix $\Sigma^*$ and parameterized graph structure $\Theta^* = (\Sigma^*)^{-1}$, as described above. For instance, $\Sigma^*$ provides a probability density function (PDF) $p(X)$ over features $X_1, \ldots, X_d$ in a data set.

In one or more implementations, the network graph exploration system 106 can compute a marginal density function over each feature $X_i$ to obtain $p(X_i)$. In some instances, the network graph exploration system 106 can condition a prior $p(X)$ on evidence (i.e., e) regarding a subset of features to derive a more informed posterior $p(X|e)$ based on a user providing input modifying an expected value or value condition (e.g., evidence), as further described below.

In some implementations, even if $p(X)$ is a Gaussian distribution with a compact closed-form representation, the posterior $p(X|e)$ can be quite complex. In these implementations, the network graph exploration system 106 can utilize Markov Chain Monte Carlo (MCMC) techniques to generate a set of samples from the posterior distribution in an efficient fashion. Here, the number of sampling steps required for convergence to a stationary distribution can be polynomial in the dimension of the space.

In one or more implementations, the network graph exploration system 106 can utilize a Metropolis-Hastings algorithm that traverses the convex set based on the distribution p and evidence e. For instance, the network graph exploration system 106 constructs a regular grid in the d-dimensional hypercube $[0, 1]^d$. In some instances, starting from some arbitrary point $x^{(0)}$, the network graph exploration system 106 can carry out a sequence of MCMC steps that include, first, starting from a current grid location $x^{(t-1)}$ and choosing a candidate successor state y. In various implementations, $y=x^{(t-1)}$ with probability ½. If y is not assigned the value of $x^{(t-1)}$, y is chosen at random and uniformly from among $x^{(t-1)}$'s 2d neighbors. Second, if y is located outside the convex set, then the network graph exploration system 106 can set $x^{(t)}=x^{(t-1)}$; otherwise, the network graph exploration system 106 can accept the new location and set $x^{(t)}=y$ with a probability $$\min\left\{1, \frac{p(y)}{p(x^{(t-1)})}\right\}.$$

Additionally, in various implementations, after an initial mixing phase, the network graph exploration system 106 can store samples $x^{(t)}$ from the Markov chain at regular intervals b. Further, the stationary distribution of this Markov chain can be $p(x)$ constrained to the convex set determined by evidence e, or $p(x|e)$. Note, in various implementations, the network graph exploration system 106 does not place restrictions on the form of the evidence e. Thus, it may consist of assigning a value to a subset of features in X, which can reduce the dimensionality of the hypercube. In the alternative, it might take the form of constraints such as $X_i \in [a,b]$ for some arbitrary values a and b within the range of the variable $X_i$, which restricts the feasible region of the hypercube to regions on one side of the hyperplane corresponding to each constraint. As an additional note, in some cases, conditioning on evidence consisting of point values can be done in closed form and may not require MCMC estimation.

Turning now to FIG. 3B, as shown, this figure includes a computing device 320 having a graphical user interface 322 that displays a network graph exploration interface 318. As also shown, the network graph exploration interface 318 includes a network graph 324. In some implementations, the computing device 320 is an example of the client device 102 introduced above.

As further shown, the network graph exploration interface 318 includes various interactive elements and options for requesting, modifying, and viewing a network graph with respect to a data set. For example, the network graph exploration interface 318 includes a document collection element 326 for selecting a document collection (i.e., a data set) and a generation element 328 to generate a network graph. While not shown, the network graph exploration interface 318 can include additional selectable options. For example, the network graph exploration interface 318 includes an option to save a copy of a modified network graph or a reset option.

Additionally, the network graph exploration interface 318 includes the network graph 324 having concept nodes 336, positive concept edges 338, and negative concept edges 340. As shown, the concept nodes 336 can include labels (e.g., name labels) as well as corresponding display values 342 and/or another type of scoring metric. In some implementations, the display values 342 are normalized to the same scale (e.g., all 1-100). In alternative implementations, in addition to the display values 342 we can also display value ranges from corresponding observation data (e.g., observations range from 2-8 units) and/or practical limits (e.g., a value cannot practically exceed 100%). In some implementations, the network graph exploration interface 318 includes maximum a-posteriori (MAP) estimates for one or more of the nodes.

Regarding the positive concept edges 338 and the negative concept edges 340, the network graph 324 can include connection strength edges between connected nodes of the concept nodes 336 that indicate a connection strength between two connected concept nodes. For example, the edges can include connection strength labels indicating the connection strength between two connected nodes. In addition, the edges can be shown in different hues, line thicknesses, etc., based on the magnitude of the connection strength between two connected nodes (e.g., with stronger connections are darker hues and/or thicker lines).

As shown, the network graph 324 is a graph that connects the concept nodes 336 based on their respective correlated concept pairings with other concept nodes. While the network graph 324 appears circular, other shapes, styles, arrangements, and designs are possible. Moreover, in various implementations, the network graph exploration system 106 presents the network graph 324 as another type of graph (e.g., a tree graph, etc.). In some implementations, the network graph exploration system 106 provides a list, table, or matrix version of the network graph 324 (e.g., a text-based version).

In various implementations, the network graph exploration system 106 provides for interaction with the network graph 324. For example, the network graph exploration system 106 can facilitate interacting with individual nodes, such as providing modified values and conditions. Additional detail regarding interacting with target nodes is provided below in the subsequent figures.

Figure 4:
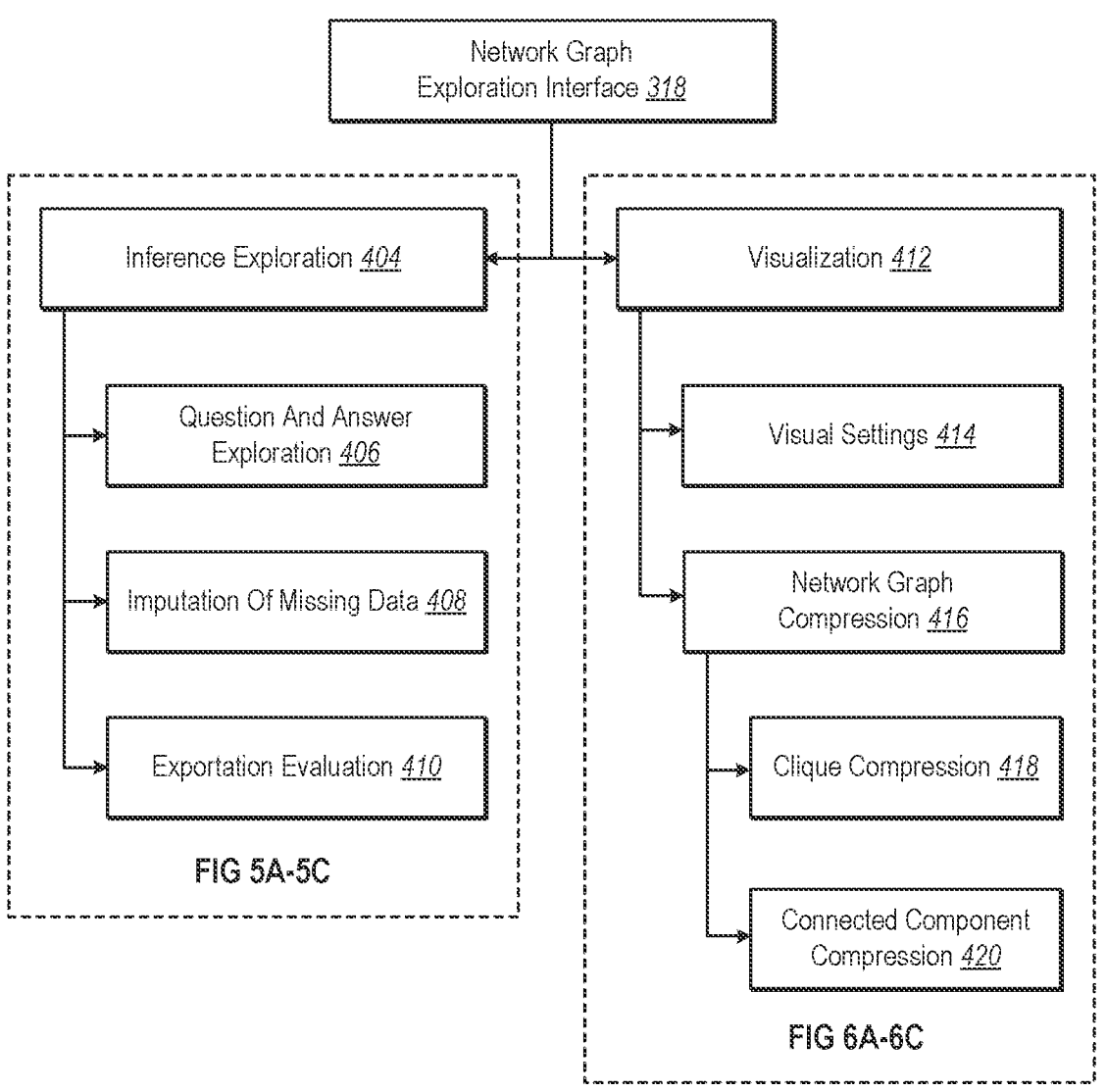
FIG. 4 illustrates providing and utilizing network graph exploration tools in accordance with one or more implementations.

FIG. 4 illustrates providing and utilizing network graph exploration tools in accordance with one or more implementations. As shown, FIG. 4 provides a framework and outline with respect to functions of the network graph exploration interface 318 introduced above. As shown in FIG. 4, the network graph exploration interface 318 can facilitate inference exploration 404 as well as provide improved visualization 412.

To elaborate, the inference exploration 404 action can include additional actions, which include question and answer exploration 406, imputation of missing data 408, and network evaluation 410. Actions corresponding to the inference exploration 404 are further described below in connection with FIGS. 5A-5C.

Additionally, the visualization 412 can include visual settings 414 and network graph compression 416. As shown, the network graph compression 416 can also include clique compression 418 and connected components compression 420. Actions corresponding to visualization 412 are further described below in connection with FIGS. 6A-6C.

Figure 5A:
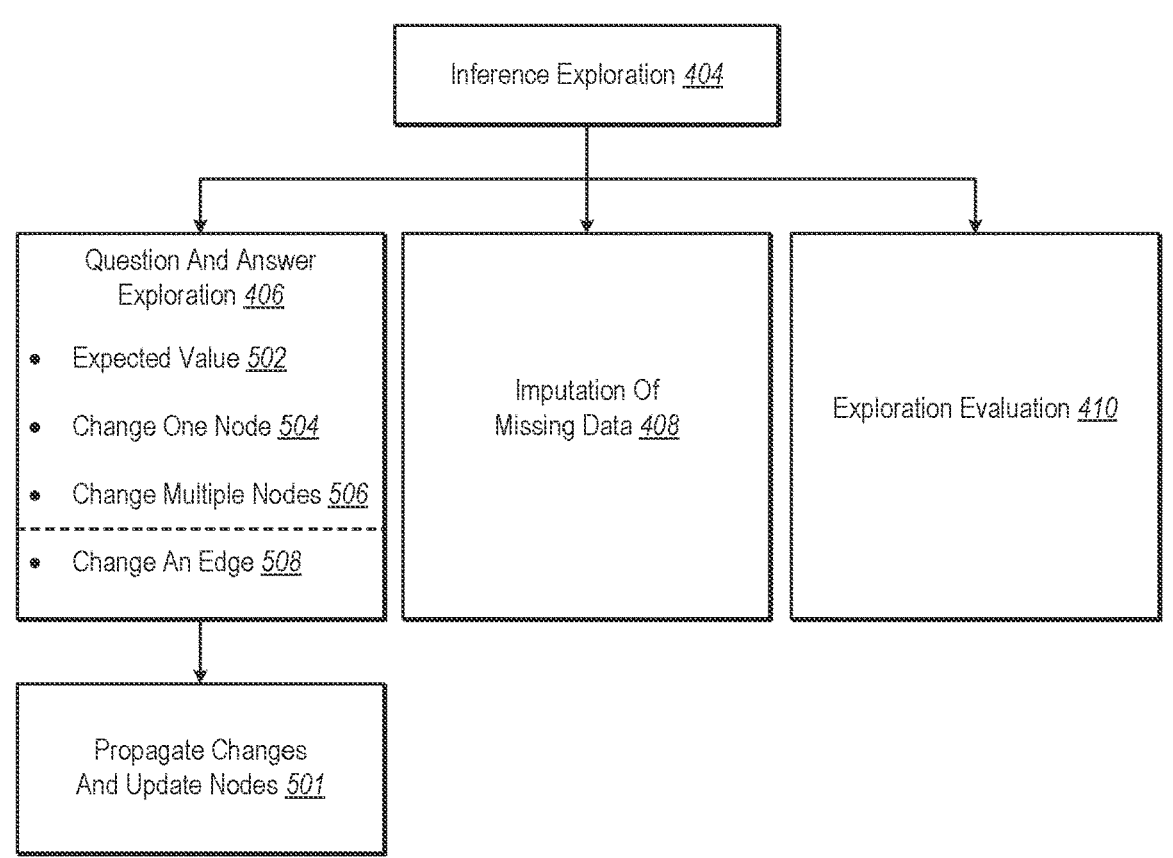
FIGS. 5A-5C illustrate utilizing inference tools for network graph exploration in accordance with one or more implementations.
Figure 5B:
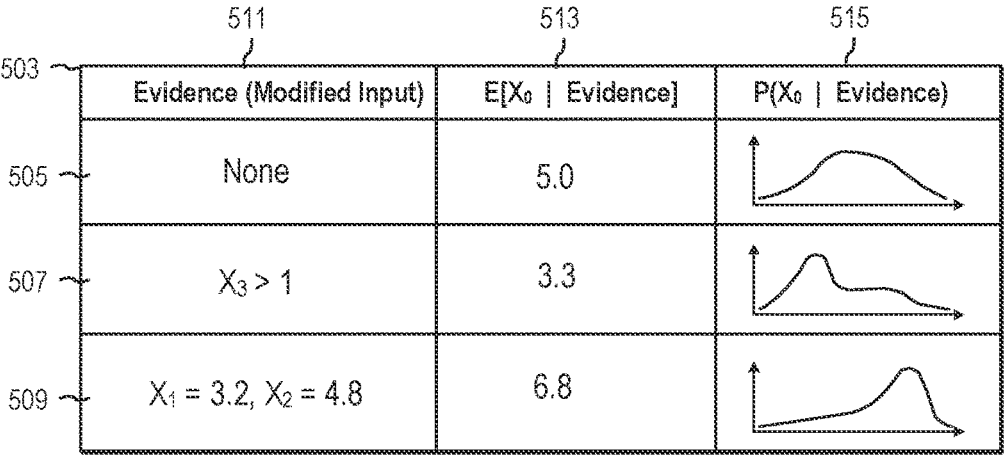
Figure 5C:
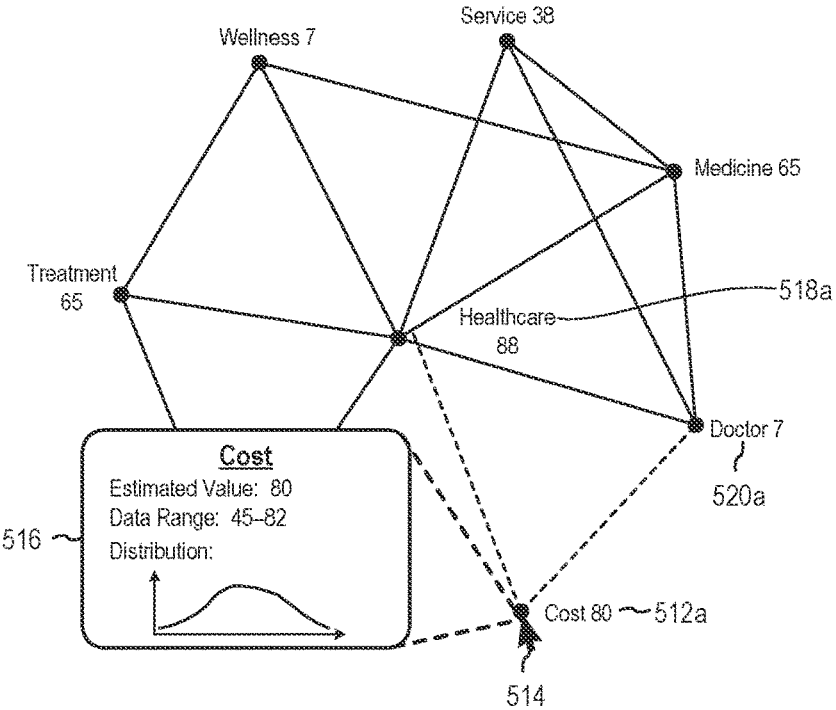
Figure 5C:
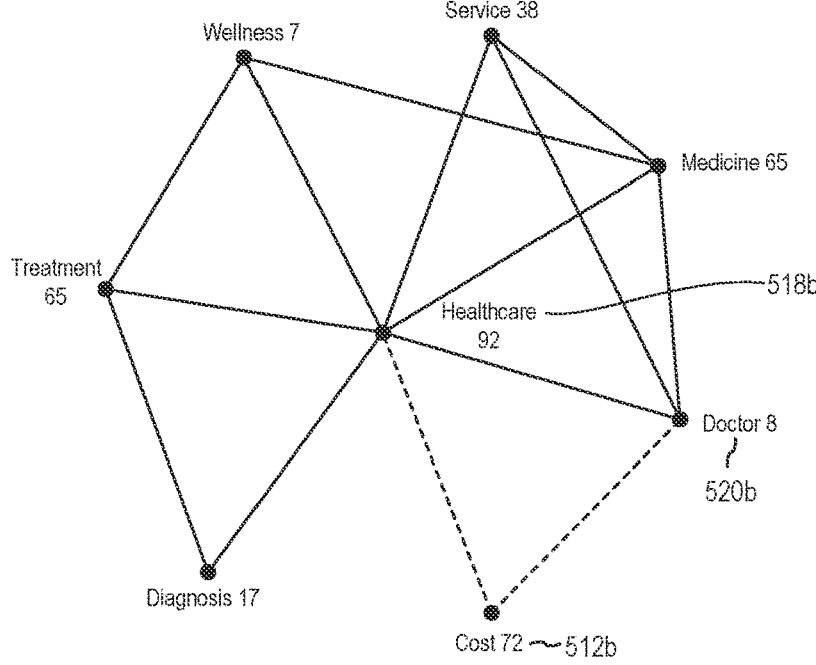

FIGS. 5A-5C illustrate utilizing inference tools for network graph exploration in accordance with one or more implementations. In particular, FIG. 5A corresponds to various inference exploration 404 actions introduced above. FIG. 5B provides a graphical table showing the results of how modifying expected values and value conditions for some nodes affects a target node. FIG. 5C illustrates before-and-after versions of a network graph to show how changing the value condition of a target node changes a network graph.

As noted above, FIG. 5A includes various inference exploration 404 actions based on the network graph exploration system 106 inferencing data in a data set, such as the question and answer exploration 406, the missing data 408, and the network evaluation 410. In addition, FIG. 5A includes an act 501 of propagating changes through the network and updating display values for nodes in a network graph. In various implementations, the question and answer exploration 406 corresponds to different queries (e.g., questions) that the network graph exploration system 106 enables a user to "ask." Indeed, based on users asking a range of questions, the network graph exploration system 106 determines answers to those questions and shows the users how the queries affect other nodes (e.g., variables) in the domain.

To elaborate, as noted above, typical machine-learning prediction models often provide one outcome variable based on values of particular input variables. These models provide no information regarding how changing the value of one input variable will affect the value of other input variables other than the selected output variable. In contrast, the network graph exploration system 106 enables a user to change one or more target variables and see how the other variables in the domain are affected. This is particularly helpful in sparse and poorly understood domains.

Accordingly, the network graph exploration system 106 facilitates an interactive interface that allows a user to submit input that modifies node values and value conditions of one or more target nodes. Indeed, the network graph exploration system 106 enables a user to input a query that asks a question of how a domain (e.g., nodes in a network graph) may change based on modifying the value of one or more target nodes or based on imposing value constraints on one or more target nodes. In some implementations, to get the steady-state value of a node, the network graph exploration system 106 determines and/or displays maximum a-posteriori (MAP) estimates.

In various implementations, the network graph exploration system 106 facilitates a list of different types of questions that it can answer once upon generating a network graph (e.g., a sparse graph) for a domain. In some instances, in generating a parameterized graph structure, the network graph exploration system 106 obtains complete information about the Gaussian distribution. For example, for a multivariate Gaussian distribution of a variable, the network graph exploration system 106 only needs the mean and variance. However, if mean centering is utilized when learning a parameterized graph structure, the network graph exploration system 106 actually only needs the variance to represent the Gaussian distribution parameterized graph structure. Indeed, once the joint probability distribution for a variable is determined, the network graph exploration system 106 can sample from it without the need of accessing the original sample data, which saves memory on computing devices.

To illustrate, the answer exploration 406 identifies a list of queries a user may request, which can include requesting the network graph exploration system 106 to determine values 502 of nodes (e.g., variables), changing one node 504, changing multiple nodes 506, and, in some instances, changing an edge 508 (e.g., changing the connection value between two nodes). Each of these requests is described in turn.

In various implementations, the network graph exploration system 106 facilitates determining values 502 (e.g., expected values or user modified values) for nodes and providing them in a network graph. In some implementations, the network graph exploration system 106 can query for the marginal distribution over any feature or variable in the data set $P(X_i)$ and determine its expected value $E[X_i]$. In various implementations, the network graph exploration system 106 determines the Maximum A Posteriori (MAP) values of the nodes or the stable state values by querying a network graph.

As noted above, the network graph exploration system 106 can display the expected values of nodes as part of a network graph. For example, in one or more implementations, the network graph exploration system 106 automatically determines and displays the expected values of nodes. In alternative implementations, the network graph exploration system 106 determines and/or displays expected value results in response to user input. Additionally, the network graph exploration system 106 can also display exact or observed values of nodes in a network graph.

In some implementations, determining values 502 reveals the value of nodes in a network graph absent any evidence (e.g., user input modifying an observed value). As noted above, the network graph exploration system 106 can compute what is the most likely value that the node will take in the absence of any evidence. Indeed, the network graph exploration system 106 can show the distribution over the values of that node in the absence of any evidence (or in the presence of evidence).

As shown, the answer exploration 406 includes the exploration question and answer function of changing one node 504. As a simple example, given a node value of 5, a user may query how do directly connected and/or other connected change when the node value is increased or decreased. For instance, a user provides input modifying the display value into an exact or observed value to server as a query (i.e., the user provides evidence), and the network graph exploration system 106 utilizes the parameterized graph structure to determine how the expected values of other variables (e.g., nodes) in the network graph change. Indeed, upon receiving evidence, the network graph exploration system 106 can see, for other nodes in the graph, how both expected values and distributions shift (e.g., the distribution may shift to a different part of its range for another variable based on the evidence) and how the changes propagate throughout the network graph (e.g., the act 501).

As another example, suppose a user desires to increase the value of a target variable by 10%. The network graph exploration system 106 enables the user to change the value of the variable accordingly. Then, the network graph exploration system 106 utilizes the correlation values in the parameterized graph structure (which remain constant) along with the modified target value to propagate the changes to other nodes in the network graph. For example, the network graph exploration system 106 determines if other variables in the network graph will yield an expected value elsewhere along their respective probability distribution based on the modified target value.

More specifically, in various implementations, the network graph exploration system 106 determines a prior distribution for each variable as part of learning the network graph (i.e., determining parameterized graph structure network parameters). Then, for a given distribution, the network graph exploration system 106 can compute the expected value and the marginal distribution over each node separately. When evidence is provided, the network graph exploration system 106 computes the posterior probability over all the other nodes. Indeed, the network graph exploration system 106 can model, in the back end, the underlying distribution of a variable parameterized graph structure learned network parameters. For example, when the input for a target variable(s) is received, the network graph exploration system 106 propagates that input or evidence through the graph to determine the posterior distribution, which can result in different expected values and slightly different marginal distributions over individual nodes.

Additionally, in various implementations, the network graph exploration system 106 can utilize one or more sampling techniques to determine the conditional distribution for a variable based on a modified target value. Similarly, in some implementations, the network graph exploration system 106 can utilize one or more closed-form equations to determine the conditional distribution for a variable based on a modified target value.

In various implementations, the action of changing one node 504 includes the network graph exploration system 106 determining the conditional over multiple nodes in a network graph based on modifying a single target node, which can be represented as $p(n_i|n_j)$, where $J=\{1, 2, 3, \ldots, j\}\backslash i$. In some implementations, the network graph exploration system 106 determines the conditional distribution over a feature in the data set given specific evidence on one or more other features.

As noted above, in various implementations, the network graph exploration system 106 can receive a query that includes a modified value for a target node (i.e., variable). In some implementations, rather than providing a value, the network graph exploration system 106 allows a user to modify a target node based on a value condition. For instance, the network graph exploration system 106 enables a user to enter a relative numerical change to a current value of a target node, a closed numerical range, and/or an open numerical range. For instance, the network graph exploration system 106 enables a user to enter a minimum value condition (e.g., $x\geq3$), a maximum value condition ($x<55$), a value condition range (which is a combination of a minimum value condition and a maximum value condition), or another type of value condition (e.g., increase x by 15% or decrease x by 5%). In addition, the network graph exploration system 106 enables a user to set a node to a fixed value or condition (e.g., keep x at an expected value of 7/10).

In various implementations, the network graph exploration system 106 provides the user with range limits. For example, the network graph exploration system 106 identifies the lowest value for the variable from observation data (i.e., sample data) as well as the highest value for the variable and provides the user with this information as the observed range. In some implementations, the network graph exploration system 106 allows a user to select values or value conditions outside of this observed range. For instance, if the observed range goes from 2-7, the network graph exploration system 106 may allow a user to input a value of 8 or 9. In some but not all cases, the network graph exploration system 106 enforces practical constraints, such as not allowing a value to go over 100%.

As shown, the answer exploration 406 includes the exploration question and answer function of changing multiple nodes 506. In some implementations, the action of changing multiple nodes 506 includes conditioning on all nodes with changed values with one or multiple target nodes. Additionally, as shown, the network graph exploration system 106 can further perform the act 501 of propagating changes through the network and updating nodes in a network graph based on the results of performing the act of changing multiple nodes 506.

In some implementations, when changing multiple nodes 506 the network graph exploration system 106 enables a user to modify multiple target nodes in a network graph. In this manner, a user can explore how changing multiple variables in a domain affects other variables in the domain. For example, if the network graph includes a variable that corresponds to a node of interest in the current exploration (e.g., the amount of methane gas that results from anaerobic digestion), the network graph exploration system 106 enables a user to modify the values of various target nodes (e.g., fix the value of some and/or add conditional values to some) and the network graph exploration system 106 will determine how the expected value of the node of interest changes (e.g., to see if how changing and/or fixing variables will increase the yield of methane gas).

As shown, the answer exploration 406 includes the exploration question and answer function of changing an edge 508. In various implementations, the network graph exploration system 106 enables a user to modify the correlation strength (e.g., edge correlation value) of target edges and observe how the other parameters change. In various implementations, the network graph exploration system 106 can modify the edge values in combination with the node values of one or more nodes being modified (e.g., restricted to certain ranges).

In these implementations, the network graph exploration system 106 can generate an updated parameterized graph structure. Indeed, when modifying values and value conditions of target nodes, the network graph exploration system 106 preserves the values of the parameterized graph structure parameters that were learned along with the network graph structure. If, however, a user modifies a connection value, the network graph exploration system 106 can generate an updated parameterized graph structure parameters that reflects new connection values between nodes in the domain.

As also shown in FIG. 5A, the inference exploration 404 also includes the imputation of missing data 408. As provided above, the network graph exploration system 106 can address data set that includes random missing values of variables by imputing those values based on the learned probability distribution and values of other known variables.

As noted above, missing values can cause significant trouble in machine-learning modeling. Accordingly, the network graph exploration system 106 can impute these missing values. For example, in various implementations, utilizing a joint probability distribution over a whole set of variables, the network graph exploration system 106 can input the values of the other features in a sample that has a missing value. Further, the network graph exploration system 106 can compute the expected value of all the other variables having the missing value.

In various implementations, the network graph exploration system 106 can utilize a probability distribution learned from complete samples to impute missing values with increased accuracy. Once a set of incomplete samples with missing values are imputed, the network graph exploration system 106 can add them to the set of complete samples to create an imputed data set, which can be represented as $X_{imp} \in \mathbb{R}^{M \times D}$. Additionally, the network graph exploration system 106 can execute the network recovery algorithm (e.g., uGLAD model) again with the imputed data set to obtain an improved (e.g., more accurate) parameterized graph structure (e.g., parameterized graph structure recovered by uGLAD).

In various implementations, the network graph exploration system 106 masks (e.g., artificially hides a known value) a fraction of data entries (e.g., values of some specific features in observations or sample data) in a data set. Then, the network graph exploration system 106 imputes the artificially missing values and compares them to the actual values present in the data set. The network graph exploration system 106 can repeat this process to learn how to impute missing data more accurately.

Stated differently, in various implementations, the network graph exploration system 106 can mask a random sample value in the data set corresponding to a node in the network graph such that the random sample value appears as a missing value. In addition, the network graph exploration system 106 generates a new value for the random sample value utilizing the imputation algorithm (described above) as well as a probability distribution determined for the node. The network graph exploration system 106 can then determine an error metric such as used in evaluating regression or classification models by comparing the new value with the random sample value. Based on the error metric, the network graph exploration system 106 can determine a network graph quality metric for the network graph.

As also shown in FIG. 5A, the inference exploration 404 also includes the network evaluation 410. In various implementations, the network graph exploration system 106 can also use inferencing and imputation to evaluate the quality of the network graphs. As noted above, unsupervised learning methods are often very difficult to evaluate. The most common solution is to run an evaluation on synthetic data, where the underlying distribution used to generate the data is known and can be compared to the distribution learned by the model being trained. While such results are helpful, the goal of evaluating real-world data remains. Indeed, real-world data may utilize different distributions from any used in synthetic experiments.

Upon imputing data and generating a complete, updated data set, the network graph exploration system 106 can use standard regression or classification evaluation metrics to evaluate the accuracy of the network and the learned distribution it represents. Examples of standard regression evaluation metrics include mean squared error (MSE), root mean squared error (RMSE), mean absolute error (MAE), and mean absolute percentage error (MAPE), which can compute error statistics for the imputation. Examples of standard classification evaluation metrics include accuracy, precision, recall, F1 score and area under the ROC curve (AUC). For instance, a low error for the imputation indicates that the probability distribution learned by a network graph recovery system is close to the one that generated the data observation (i.e., sample data).

FIG. 5B, as noted above, provides a table 503 of how modifying the display value (e.g., modifying to a desired value) of one or more nodes (e.g., $X_1$, $X_2$, and $X_3$) can affect the expected value of a target node (i.e., $X_0$) in a domain. To illustrate, the table 503 in FIG. 5B includes a first column 511 of modified inputs of one or more nodes, a second column 513 of the expected value of a target node (i.e., $X_0$) based on the modified inputs, and a third column 515 of the probability distribution of the target node based on the modified inputs. The table 503 also includes a first row 505, a second row 507, and a third row 509.

As shown, the first row 505 shows the expected value (i.e., 5.0) and the probability distribution based on no modified input (e.g., no evidence) being provided for variables in the domain. The second row 507 shows how the expected value changes to 3.3 based on a modified input indicating a value condition of $X_3 > 1$. The second row 507 also shows how the probability distribution changes based on the modified value condition of $X_3$. Likewise, the third row 509 shows how the expected value and the probability distribution change based on the modified values of $X_1$ and $X_2$. As shown, the modified input can change both the expected value as well as the probability distribution for the target node.

FIG. 5C, as noted above, illustrates before-and-after versions of a network graph to show how changing the value condition of a target node changes a network graph. In particular, FIG. 5C includes a network graph in a pre-modified value condition 510a and the same network graph in a post-modified value condition 510b. In various implementations, the network graph exploration system 106 provides the different versions of the network graph in an interactive interface, such as the network graph exploration interface 318 provided in FIG. 3B.

As shown, the network graphs include nodes representing variables in a domain as well as node values (i.e., observed values, expected values, or steady-state values). As also shown, the values include a maximum value for each variable (e.g., 7 out of 10, 38 out of 50, and 65 out of 100). The maximum value may correspond to a maximum observed range value, a maximum feasible range value, a maximum normalized value, etc. In various implementations, the network graph can also include and/or show corresponding minimum values. In addition, as shown, the network graph includes positive edges (solid lines) and negative edges (dashed lines). In other instances, network graphs include edges with more complex parametrization.

As shown in the pre-modified value condition 510a, the network graph includes a Cost Node 512a, which has an expected value of 80. The Cost Node 512a is negatively connected to a Healthcare Node 518a (with an expected value of 88) and a Doctor Node 520a (with an expected value of 7).

As noted above, the network graph exploration system 106 allows a user to interact with a network graph. For example, as shown, a user selects 514, clicks, hovers, or otherwise interacts with the Cost Node 512a. In response, the network graph exploration system 106 displays a popup interface 516 that provides additional information regarding the cost variable (including the observable data range of the sample data or a feasible range provided by an expert). While various pieces of information are shown such as a probability distribution graph and a data range, the network graph exploration system 106 can provide additional or different pieces of information.

In various implementations, the network graph exploration system 106 can provide interactive elements within the popup interface 516. For example, the network graph exploration system 106 enables a user to provide a new input value for the variable. In some instances, a slider or bar is provided to modify the value. In one or more implementations, the network graph exploration system 106 provides one or more fields where value conditions can be input.

Indeed, as noted above, the network graph exploration system 106 enables a user to modify the value of a target node. To further illustrate, a user enters the value of 72 for the Cost Node 512a. The value then changes from 80 (as shown in pre-modified value condition 510a) to 72 (as shown in 510b). For example, a user indicates a 10% reduction of the estimated value of the Cost Node 512a and, in response, the network graph exploration system 106 lowers the value accordingly.

As provided above, by modifying the value of a target node, the expected values of other nodes in a domain can change. To illustrate, the post-modified value condition 510b show how the expected values of the Healthcare Node 518b and the Doctor Node 520b both increase. For instance, because the Healthcare Node 518b and the Doctor Node 520b have a negative correlation with the Cost Node 512b, when the expected value of cost goes down, the expected values of nodes connected to the Cost Node 512b increase. Similarly, if the expected value of a target node goes up, nodes with a positive correlation to that node will increase in their expected values. The change in expected values may also propagate to other nodes in the network graph that are not directly connected to the target node. As described above, the network graph exploration system 106 can change display values based on the modified value of the target node, the connection values indicated in the parameterized graph structure data structure holding network parameters.

In some implementations, the post-modified value condition 510b can indicate which node is the target node that has been modified. In some cases, the network graph exploration system 106 can indicate when there are multiple target nodes. Likewise, in various implementations, the network graph exploration system 106 indicates which of the other nodes change as a result of a modified target node and/or how these other nodes have changed.

Figure 6A:
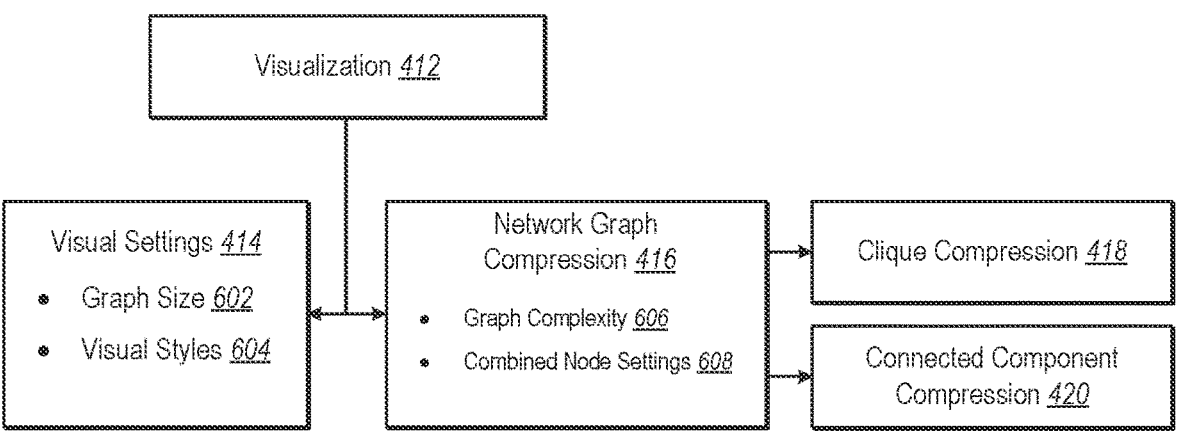
FIGS. 6A-6C illustrate utilizing visualization tools for network graph exploration in accordance with one or more implementations.
Figure 6B:
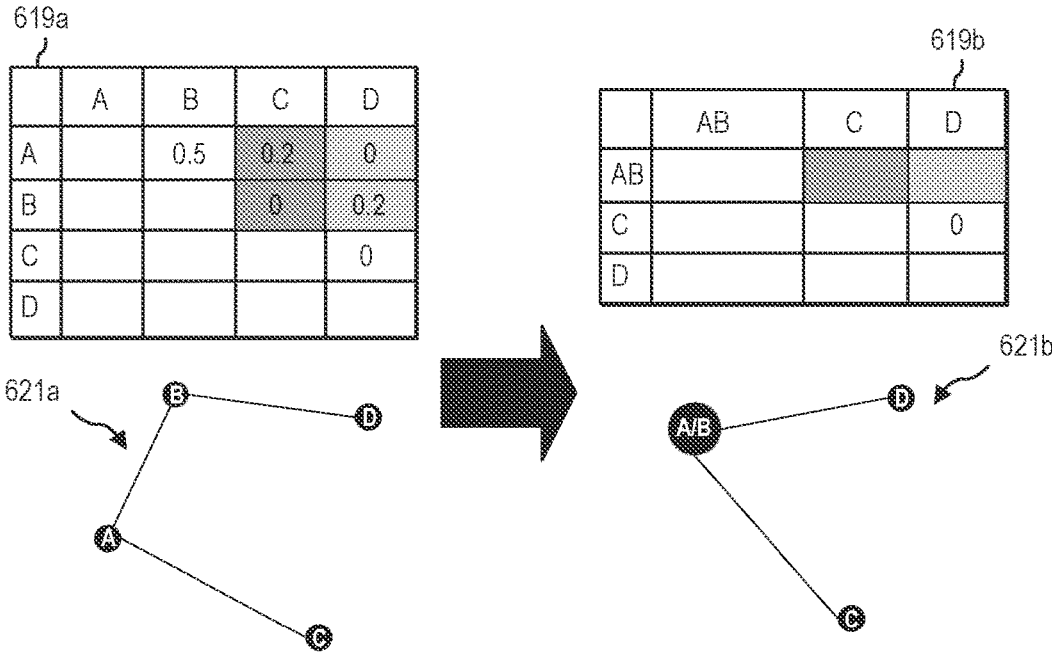
Figure 6C:
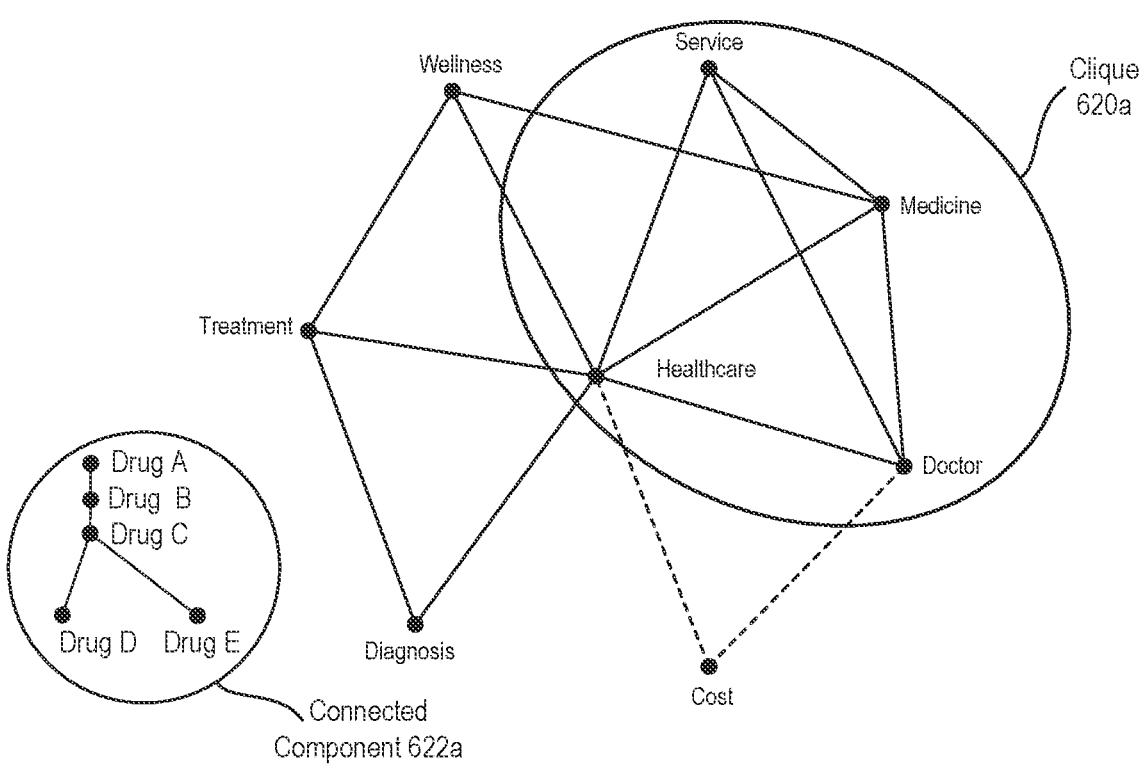
Figure 6C:
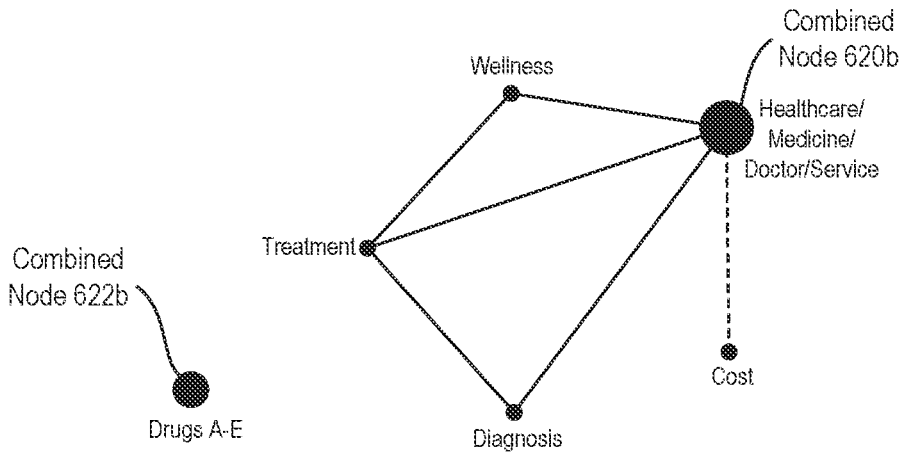

Turning now to FIGS. 6A-6C, additional detail is provided regarding network graph compression. For example, FIG. 6A corresponds to various visualization 412 actions introduced above. FIG. 6B provides a graphic for compressing multiple nodes. FIG. 6C illustrates before-and-after versions of a network graph to show compressing a network graph.

As noted above, FIG. 6A includes various visualization 412 actions, such as applying visual settings 414 and applying network graph compression 416. Examples of visual settings 414 include modifying the graph size 602 or modifying visual styles 604 of a network graph. For instance, the network graph exploration system 106 provides multiple settings that allow a user to customize the size, scope, style, look, and/or appearance of a network graph. For example, the visual settings 414 enable a user to select a first color to represent positive edges and a second color to represent negative edges. As an additional example, the visual settings 414 use colors to represent other network parameters other than positive and negative edges. As another example, the visual settings 414 allow a user to select which labels are displayed in a network graph and/or what information is provided in a popup interface.

In some implementations, the network graph exploration system 106 utilizes one or more visual thresholds in connection with applying visual features or effects. For example, the network graph exploration system 106 utilizes various visual thresholds to determine the magnitude or type of a visual effect to apply to a pair of correlated nodes. For instance, the network graph exploration system 106 applies a lighter shade of green to a first correlated node pair based on a weaker connection strength and a darker shade of green to a second correlated node pair based on a stronger connection strength.

As shown, FIG. 6A includes network graph compression 416 as one of the visualization 412 actions. In various implementations, the network graph exploration system 106 utilizes the network graph compression 416 element to determine when and how to apply compressions to nodes in a network graph. As also shown, the network graph compression 416 element includes graph complexity 606 and combined node settings 608.

As provided above, in some instances, a graph representation of the learned probability distribution of a domain may not be very readable in the case of a large number of features. Accordingly, the network graph exploration system 106 improves the visualization of the network graph to make it more comprehendible. In this manner, the network graph exploration system 106 can improve the usefulness of network graphs while preserving their domain structure. Indeed, unlike existing computer systems that perform generic node clustering, the network graph exploration system 106 preserves domain structure such that underlying distributions can still be queried. Further, the preserved domain structure also allows for modified inputs to still propagate throughout a compressed network graph, using the techniques and approaches detailed above.

Accordingly, as shown in FIG. 6A, the network graph compression 416 element includes graph complexity 606. In various implementations, the network graph exploration system 106 determines a graph complexity metric for a network graph. For example, the graph complexity metric indicates how busy, cluttered, and/or oversaturated a network graph may be. In many cases, a busy network graph is too cluttered to be of use to a user when desiring to perform domain exploration. For instance, a network graph may be too busy or crowded to see nodes, edges between nodes, or read node labels.

In one or more implementations, the network graph exploration system 106 determines the graph complexity metric based on the number of edges in the network graph. For example, in some instances, the network graph exploration system 106 determines an average number of edges (e.g., connections) per node in the network graph as a graph complexity metric (or a ratio of edges to nodes). In various instances, the network graph exploration system 106 determines the total number of edges and/or nodes in the network graph as a graph complexity metric. In one or more instances, the network graph exploration system 106 determines the number of edges that overlap one another as a graph complexity metric. In additional instances, the network graph exploration system 106 can utilize a different measurement to determine a graph complexity metric. In example implementations, the graph complexity metric can be based on the number and average length of node or connection labels.

Additionally, the network graph exploration system 106 can compare the graph complexity metric to a network graph complexity threshold. For instance, the network graph complexity threshold can indicate when a network graph is too complex or busy. In some implementations, the network graph exploration system 106 employs various and/or different network graph complexity thresholds. For example, the network graph exploration system 106 utilizes a first network graph complexity threshold corresponding to the average number of edges per node and a second network graph complexity threshold corresponding to the total number of edges.

Upon determining that a network graph complexity threshold for a network graph is satisfied (e.g., the graph complexity metric exceeds the network graph complexity threshold), the network graph exploration system 106 can compress nodes of the network graph. In various implementations, the network graph exploration system 106 compresses a predetermined number of nodes. In some implementations, the network graph exploration system 106 compresses nodes until the network graph complexity threshold is no longer exceeded (e.g., the graph complexity metric falls below the network graph complexity threshold). In example implementations, the network graph exploration system 106 allows a user to indicate the degree to which a network graph should be compressed (e.g., based on user input or preferences).

In one or more implementations, the network graph exploration system 106 reduces complexity in a network graph by identifying cliques and applying clique compression 418. For example, the network graph exploration system 106 identifies cliques, which include groups of nodes where all nodes are interconnected. For example, a group of four nodes would include six total edge connections while a group of six nodes would include fifteen total connections.

In various implementations, the network graph exploration system 106 identifies the largest possible cliques for a group of nodes (as a larger clique can include sub-groups of smaller cliques). In example implementations, the network graph exploration system 106 requires a clique to be a minimum number of nodes (e.g., 3+ nodes). In some implementations, the network graph exploration system 106 selects a clique based on connection strength or other parameters representing the connection (e.g., selecting a group of nodes that have stronger correlations).

In some implementations, the network graph exploration system 106 also ensures that a potential clique includes only positive correlations or edge connects. For example, a group of nodes that largely includes positive connections and one or more negative connections is not a clique that is qualified for compression. In certain implementations, the network graph exploration system 106 identifies a clique that includes nodes having only negative connections. In alternative implementations, cliques between three or more nodes cannot include only negative connections.

Upon identifying a clique, the network graph exploration system 106 can combine the nodes into a combined node. For example, the network graph exploration system 106 merges each of the nodes and their corresponding connections into a central combined node. Further information regarding generating a combined node is provided below in connection with FIG. 6B. Additionally, a visual example of this process is provided below in connection with FIG. 6C.

In some implementations, the network graph exploration system 106 reduces complexity in a network graph by identifying and applying connected components compression 420. For example, the network graph exploration system 106 identifies nodes that are part of a connected component, which includes a group of connected nodes that connect to each other by at least one connection and that are not connected to other nodes belonging to a larger group (e.g., an isolated sub-group of nodes apart from a larger group). In various implementations, the network graph exploration system 106 sets an upper limit for the number of nodes that can be in a connected component (e.g., 3, 5, or 7 nodes or less than 10% of the total nodes).

Upon identifying a connected component, the network graph exploration system 106 can combine the nodes into a combined node. For example, the network graph exploration system 106 merges each of the nodes in the connected component into a central combined node. Because a connected component is isolated or apart from other groups of nodes, the network graph exploration system 106 need not worry about including connections from the combined node to other nodes in the network graph. A visual example of this process is provided below in connection with FIG. 6C.

In various implementations, the network graph exploration system 106 can compress cliques before connected components (or vice versa). In some implementations, the network graph exploration system 106 alternates between compressing cliques and connected components, starting with the largest node groups. In certain implementations, the network graph exploration system 106 can choose between compressing cliques and connected components depending on the desired level of compression as connected components often place a less stringent requirement on the sub-graph structure.

In one or more implementations, even after compressing the cliques, the network graph exploration system 106 may determine that the network graph is still too busy. In these implementations, the network graph exploration system 106 may relax the clique requirement (but not the positive connection requirement). For example, the network graph exploration system 106 may relax the requirement that every node in a group connects to each other. For instance, the network graph exploration system 106 requires that the majority of nodes connect to each other and/or that the remaining nodes in the group connect to at least a majority of nodes in the group (e.g., allow for imperfect cliques). According to some instances, the network graph exploration system 106 allows for a small fraction of the connections to be missing in a clique. In some implementations, the network graph exploration system 106 may continue to relax the clique requirements until a graph complexity metric no longer exceeds the network graph complexity threshold. In some implementations, the network graph exploration system 106 may then compress connected components after compressing imperfect cliques.

As noted above, the network graph compression 416 element includes the combined node settings 608. For example, the network graph exploration system 106 can enable a user to provide preferences regarding combined nodes. For example, a user can specify if combined nodes should be larger than other nodes, if combined nodes should appear differently than other nodes, what kind of popup interface should be associated with a combined node (e.g., should it list all of the nodes that make up the current by node), and/or a naming convention for the combined node (e.g., a generic name, a concatenation of the sub-node names in the combined node, an estimated name that represents the sub-nodes, etc.).

FIG. 6B provides an example of generating a combined node from a clique in some implementations. As shown, FIG. 6B includes a first parameterized graph structure 619a in the form of precision matrix that corresponds to a simplified network graph 621a. As shown in connection with the first parameterized graph structure 619a, Node A correlates with Node B (e.g., with a correlation value of 0.5), Node A correlates with Node C (e.g., with a correlation value of 0.2), and Node B correlates with Node D (e.g., with a correlation value of 0.2). Node C does not correlate with Node D and thus, has a correlation value of zero along with other node pairs not connected. Further, the first parameterized graph structure 619a only shows the upper part half as the bottom part of the matrix is symmetric.

As also shown, the correlation between Node A and Node B (i.e., 0.5) is stronger than the correlation between Node A and Node C (i.e., 0.2) as well as Node B and Node D (i.e., 0.2). Accordingly, the network graph exploration system 106 may select Node A and Node B as the clique based on the correlation between Node A and Node B is stronger than other correlations for cliques of the same size.

As noted above, the network graph exploration system 106 can run an algorithm to merge the identified clique into a combined node. In some implementations, the network graph exploration system 106 determines to reposition notes and combine nodes on the graph to improve readability and decrease busyness. In various implementations, in combining the nodes, the network graph exploration system 106 can generate an updated parameterized graph structure with new correlation values between the remaining nodes.

To illustrate, FIG. 6B includes a second parameterized graph structure 619b in the form of precision matrix that corresponds to a combined version of the simplified network graph 621b. As also shown, the new Combined Node A/B is connected to Node C on one end and Node D on the other end. Indeed, Combined Node A/B includes a correlation value with both Node C and Node D. This is also shown by the shading in the second parameterized graph structure 619b that aligns with that in the first parameterized graph structure 619a. Additional detail for determining new correlation values as a result of a combined node is described next.

As noted above, the network graph exploration system 106 can combine multiple nodes in a network graph into a combined node. To preserve the structure of the domain, however, it is important that the network graph exploration system 106 determine new correlation values that are accurate. Indeed, the network graph exploration system 106 needs to generate an update having a probability distribution that merges nodes while still matching what was learned originally.

Accordingly, in various implementations, the network graph exploration system 106 utilizes the following approach to determine accurate correlation values for combined nodes. First, consider an edge $e_{i,j}$ between two (e.g., nodes $x_i$ and $x_j$) in a parameterized graph structure (e.g., Node A and Node B). Next, given that the network graph exploration system 106 has observed all the other node values in the graph, if the value of the node $x_i$ is increased, the value of the node $x_j$ will increase or decrease based on the sign of the correlation. In some implementations, the network graph exploration system 106 utilizes the formula shown in Equation 2 below to analyze correlations of a combined node.

$$p(x_i, x_j \mid x_{N-\{i,j\}}) \propto \exp[x_i, x_j]^T \begin{bmatrix} 1 & e_{ij} \\ e_{ij} & 1 \end{bmatrix} [x_i, x_j] \qquad (2)$$

Additionally, in one or more implementations, the network graph exploration system 106 updates the correlations of a group of compressed nodes. To elaborate, consider that the use network graph exploration system 106 has learned a parameterized graph structure from a sparse graph recovery algorithm (e.g., uGLAD) based on $\Theta \in \mathbb{R}^{D \times D}$ on a data set of $X \in \mathbb{R}^{M \times D}$. After compressing the sparse graph as described above with respect to Equation 2, the network graph exploration system 106 can derive the correlation to the other nodes from the set of nodes $C \subset D$ that will be grouped together. Note, that while the following considers a single set for describing the algorithm, the same techniques and approach can be extended to multiple sets.

To further illustrate, in one or more implementations, $X=[x_1, x_2, x_3, \ldots, x_D]$, where each $x_i \in \mathbb{R}^M$ represents a column vector for the node $n_i$ in a parameterized graph structure. Also, without loss of generality, in various implementations, nodes $C=[n_1, n_2, \ldots, n_c]$ are grouped together by a graph compression algorithm (e.g., clique compression 418 and/or connected components compression 420). Note, in some instances, |C| represents the cardinality of the set. In addition, in various implementations, the network graph exploration system 106 defines the modified input matrix as $X_o=[x_C, x_{|C|+1}, \ldots, X_D] \in \mathbb{R}^{(D-C) \times (D-C)}$ where $x_C \in \mathbb{R}^{(D-C)}$ is a column vector for the cluster set C.

Given the above, in some implementations, the network graph exploration system 106 can preserve the correlations even after clustering the nodes. For example, let $X_{D-C}=[x_{|C|+1}, \ldots, X_D]$ be the remaining nodes outside of the cluster. Here, the network graph exploration system 106 will attempt to achieve (as closely as possible) the relationships represented by the formula shown in Equation 3 below.

$$X_{D-C}^T \cdot x_C = X_{D-C}^T \cdot x_1 \qquad (3)$$
$$X_{D-C}^T \cdot x_C = X_{D-C}^T \cdot x_2$$
$$\ldots$$
$$X_{D-C}^T \cdot x_C = X_{D-C}^T \cdot x_{|C|}$$

To this end, the network graph exploration system will pose estimating $x_C$ as an optimization problem as shown in FIG. 4 below.

$$x_C = \text{argmin}_{x_C} \sum_{i=1}^{|C|} \left( X_{D-C}^T \cdot x_C - X_{D-C}^T \cdot x_i \right) \tag{4}$$

Further, the network graph exploration system 106 can take the derivative with respect to $X_C$ to determine the minima, as shown in equation 5 below.

$$x_C = \frac{1}{|C|} X_{D-C}^+ \left( \sum_{i=1}^{|C|} X_{D-C}^T \cdot x_i \right) \tag{5}$$

In Equation 5, $A^+ = (A^T A)^{-1} A^T$ can represent the pseudo-inverse of any matrix A. In various implementations, the network graph exploration system 106 can calculate this closed-form update efficiently using vectorized implementation.

Additionally, the network graph exploration system 106 can update the data $X_o = [x_C, x_{|C|+1}, \ldots, X_D]$ on which the sparse graph recovery model can be re-run to obtain an updated parameterized graph structure. In these implementations, the entries of the updated parameterized graph structure will be the correlation values for the clustered graph (i.e., combined network graph). Also, for multiple cluster sets, the network graph exploration system 106 can individually calculate the column vectors using Equation 5 to obtain the modified data $X_o$ for the clustered graph. In this manner, the network graph exploration system 106 can learn a joint distribution over the cluster graph that can be used for downstream inference (e.g., question and answer queries).

FIG. 6C, as noted above, illustrates before-and-after versions of a network graph to show compressing a network graph. In particular, FIG. 6C includes an uncompressed network graph 610a and a compressed network graph 610b. In various implementations, the network graph exploration system 106 provides the different versions of the network graph in an interactive interface, such as the network graph exploration interface 318 provided in FIG. 3B.

As shown, the uncompressed network graph 610a includes nodes representing variables in a domain connected via edges. For simplicity, expected values are not included. In particular, the uncompressed network graph 610a includes a clique 620a of a group of four nodes (e.g., the Medicine Node, the Healthcare Node, the Doctor Node, and the Service Node) that are each interconnected. While the Healthcare Node forms three smaller cliques with other nodes (e.g., Healthcare-Diagnosis-Treatment, Healthcare-Wellness-Treatment, and Healthcare-Wellness-Medicine). In other implementations, the network graph exploration system 106 may compress only cliques with all edges exceeding a given connection strength. In yet other implementations, where edges are parametrized in a more complex way than a single correlation number, other constraints on edge parameters may be placed. In various implementations, the network graph exploration system 106 can first seek to identify the largest clique that includes the greatest number of interconnected nodes.

As shown in the compressed network graph 610b, the network graph exploration system 106 can generate a combined node 620b by compressing the clique 620a. For instance, the network graph exploration system 106 generates a larger combined node (e.g., or hypernode). As described above, the network graph exploration system 106 can enlarge the size, apply different naming conventions, and/or apply different visualization settings to the combined node 620b.

Returning to the uncompressed network graph 610a, a connected component 622a is shown. As illustrated, the connected component 622a is a subgroup of nodes (e.g., Drug A-E Nodes) that is isolated or apart from the larger group of nodes. Again, the network graph exploration system 106 can generate a combined node from a group of nodes forming a connected component. To illustrate, the compressed network graph 610b includes a combined node 622b that compresses the connected component 622a. Thus, as shown, the compressed network graph 610b is more readable than the uncompressed network graph 610a.

Figure 7:
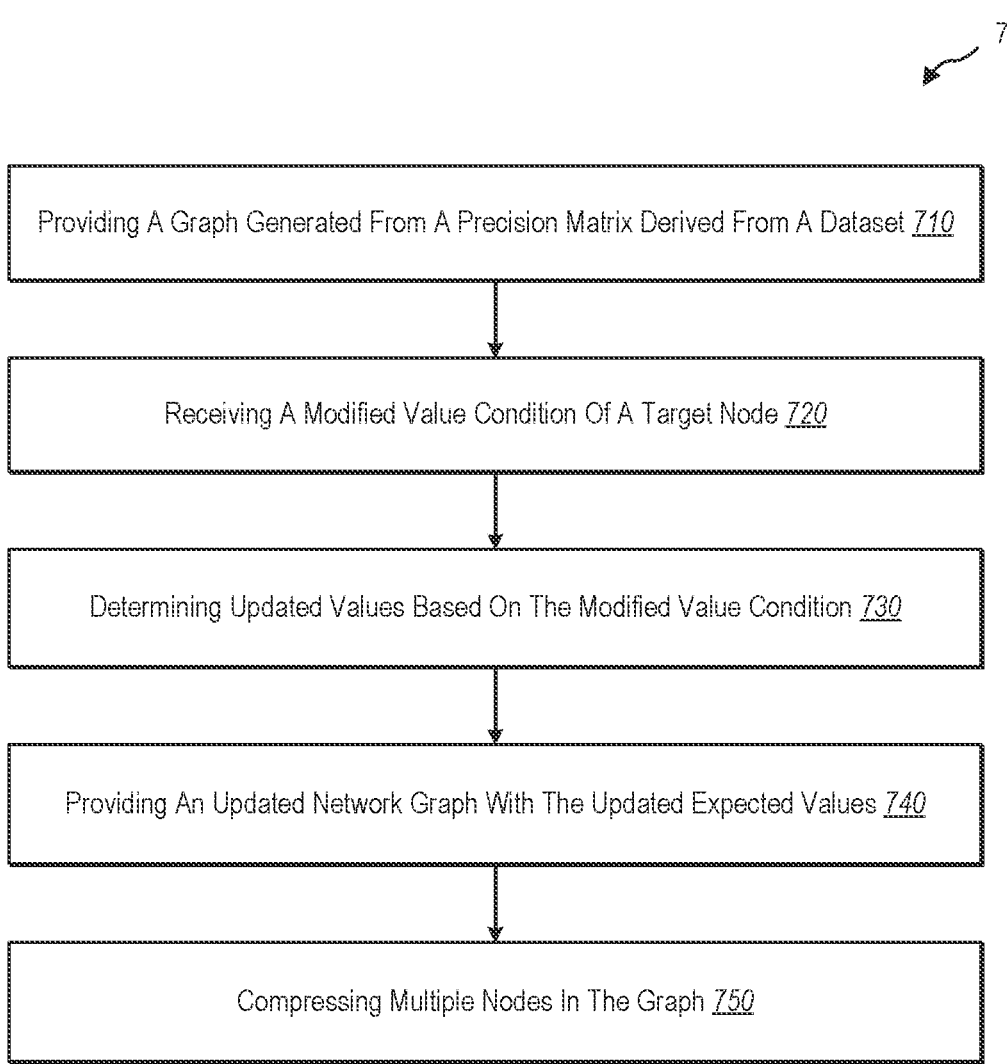
FIG. 7 illustrates an example series of acts for facilitating network-graph exploration in accordance with one or more implementations.

Turning now to FIG. 7, this figure illustrates an example flowchart that includes a series of acts 700 for utilizing the network graph exploration system 106 in accordance with one or more implementations. While FIG. 7 illustrates acts according to one or more implementations, alternative implementations may omit, add to, reorder, and/or modify any of the acts shown. Further, the acts of FIG. 7 can be performed as part of a method. Alternatively, a non-transitory computer-readable medium can include instructions that, when executed by one or more processors, cause a computing device to perform the acts of FIG. 7. In still further implementations, a system can perform the acts of FIG. 7.

For example, FIG. 7 illustrates a series of acts 700 for facilitating network-graph exploration in accordance with one or more implementations. As shown, the series of acts 700 includes an act 710 of providing a graph generated from a parameterized graph structure derived from a data set. For instance, the act 710 may involve providing, within a graphical user interface, a network graph (e.g., a parameterized network graph) that includes a set of nodes connected with a set of edges, where the network graph is a parameterized graph structure generated from a data set utilizing machine-learning sparse graph recovery model. In one or more implementations, the input includes multiple modified value conditions corresponding to multiple nodes within the network graph.

In some implementations, the act 710 includes generating the network graph by determining, for each node of the set of nodes, a marginal probability distribution (which may be conditioned on the received modified value condition), an expected value, and a maximum a-posteriori (MAP) estimate from a joint probability generated from sample data (e.g., observation data or sample data) by the machine-learning sparse graph recovery model. In various implementations, the act 710 also includes determining an updated value for a first node from the subset of nodes based on an edge connection value from the parameterized graph structure between the first node and the target node, the modified value condition of the target node, and/or a probability distribution generated for the target node. For example, the act 710 includes determining the updated values for the subset of nodes is based on the edge connection values coming from the parameterized graph structure with the target node/nodes. In various implementations, the propagation of values from the target nodes to the subset of nodes also accounts for the underlying probability distribution defined by the parameterized graph structure. Notably, the update process does not have to be sequential, so, in some instances, propagation of the impact of observation may occur differently.

As further shown, the series of acts 700 includes an act 720 of receiving a modified value condition of a target node. For example, the act 720 may involve receiving a modified value condition as input modifying a value of a target node from the set of nodes. In some implementations, the modified value condition includes a numeric value modifying a value of the target node, a relative numerical change to a displayed value of the target node (or any desired value within that node's range), and a closed numerical range based on sample data corresponding to the target node from the data set or an open numerical range based on sample data corresponding to the target node from the data set.

As further shown, the series of acts 700 includes an act 730 of determining updated values based on the modified value condition. For example, the act 730 may include determining, for a subset of nodes that are connected (directly or indirectly) to the target node, updated values based on the modified value condition and the parameterized graph structure. In various implementations, the act 730 includes maintaining the same edge connection values for the set of nodes in the network graph (e.g., the values in the parameterized graph structure do not change). In example implementations, the updated values comprise observed values for nodes inside the set of nodes for which values have been provided by a user and/or the updated values include updated steady-state values for nodes outside the set of nodes for which values have not been received and/or updated conditional distributions over variables in the data set for nodes in the set of nodes for which new value conditions have not been received. In certain implementations, determining the updated steady-state values is further based on parameterized graph structure network parameters corresponding to the network graph. In some implementations, the act 730 includes determining, for a subset of nodes that are connected to the target node, updated joint distribution over these nodes and determining display values (expected values, MAP values, etc. (any statistical estimate)) for these nodes based on the modified value condition and the parameterized graph structure.

As further shown, the series of acts 700 includes an act 740 of providing an updated network graph with the updated expected values. For example, the act 740 may involve providing, by updating the graphical user interface, an updated network graph that includes the subset of nodes with the updated expected values.

As further shown, the series of acts 700 includes an act 750 of compressing multiple nodes in the graph. For example, the act 750 may include compressing, based on determining that a graph complexity metric in the network graph exceeds a network graph complexity threshold, multiple nodes from the set of nodes in the network graph by combining an additional subset of nodes into a combined node until the network graph complexity threshold is no longer exceeded. In some implementations, the act 750 includes determining that an average number of connections per node in the network graph exceeds a network graph complexity threshold and, based on the network graph complexity threshold being exceeded, compressing multiple nodes from the set of nodes in the network graph by combining an additional subset of nodes into a combined node.

In various implementations, the act 750 includes combining the additional subset of nodes includes determining that each node in the additional subset of nodes is connected to each other node in the subset of nodes, determining that each edge connection value in the additional subset of nodes matches a given constraint (e.g., each has a positive value), and/or determining that the additional subset of nodes is located apart from a larger node subset within the network graph. In one or more implementations, compressing the multiple nodes includes generating an updated parameterized graph structure having updated edge connection values between the combined node and nodes connected to the combined node.

In various implementations, the act 750 includes compressing multiple nodes from the set of nodes in the network graph by combining an additional subset of nodes into a combined node. In one or more implementations, each node in the additional subset of nodes is connected to each other node in the subset of nodes. In one or more implementations, determining the updated values for the subset of nodes includes determining an updated expected value for a first node from the subset of nodes based on an edge connection value from the parameterized graph structure between the first node and the target node, the modified value condition of the target node, and a joint probability distribution generated for the set of nodes.

In some implementations, the series of acts 700 includes additional acts. For example, in certain implementations, the series of acts 700 includes acts of receiving additional input modifying an parameters for edge connection value between a first node and a second node of the set of nodes; generating a first set of updated edge connection values between the first node and a first subset of nodes connected to the first node; generating a second set of updated edge connection values between the second node and a second subset of nodes connected to the second node; and providing, by updating the graphical user interface, a further updated network graph that includes the first set of updated edge connection values and the second set of updated edge connection values.

In various implementations, the series of acts 700 includes acts of determining that the data set has a set of randomly missing sample values corresponding to a set of node in the network graph; generating a new value for the randomly missing sample value based on an imputation algorithm, values of other nodes in the sample and a joint probability distribution over the set of nodes (all the nodes) (e.g., generating values for the randomly missing sample values based on an imputation algorithm, values of other nodes in the samples, and a joint probability distribution over the set of nodes; generating an updated parameterized graph structure based on a set of samples with new imputed values; and providing, by updating the graphical user interface, a new network graph that is learned from both complete and the imputed values.

In one or more implementations, the series of acts 700 includes acts of evaluating network graph quality by masking a set of random sample values in the data set corresponding to a set of nodes in the network graph such that the random sample values appear as missing values; generating new values for the set of random samples based on an imputation algorithm, values of other nodes in the data set and a joint probability distribution determined for nodes in the data set; determining an error metric utilizing a regression or classification evaluation metric by comparing the new values with true values (e.g., true values) for the random samples; and determining a network graph quality metric for the network graph based on the error metric. In various implementations, these acts occur in a batch mode that imputes values for multiple nodes rather than a single imputation.

A "computer network" (hereinafter "network") is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links that can be used to carry needed program code means in the form of computer-executable instructions or data structures and which can be accessed by a general-purpose or special-purpose computer. Combinations of the above should also be included within the scope of computer-readable media.

In addition, the network (i.e., computer network) described herein may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which one or more computing devices may access the network graph exploration system 106. Indeed, the networks described herein may include one or multiple networks that use one or more communication platforms or technologies for transmitting data. For example, a network may include the Internet or other data link that enables transporting electronic data between respective client devices and components (e.g., server devices and/or virtual machines thereon) of the cloud computing system.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network (i.e., computer network) or data link can be buffered in RAM within a network interface module (NIC), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions include, for example, instructions and data that, when executed by a processor, cause a general-purpose computer, special purpose computer, or special purpose processing device to perform a certain function or group of functions. In some implementations, computer-executable instructions are executed by a general-purpose computer to turn the general-purpose computer into a special-purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Figure 8:
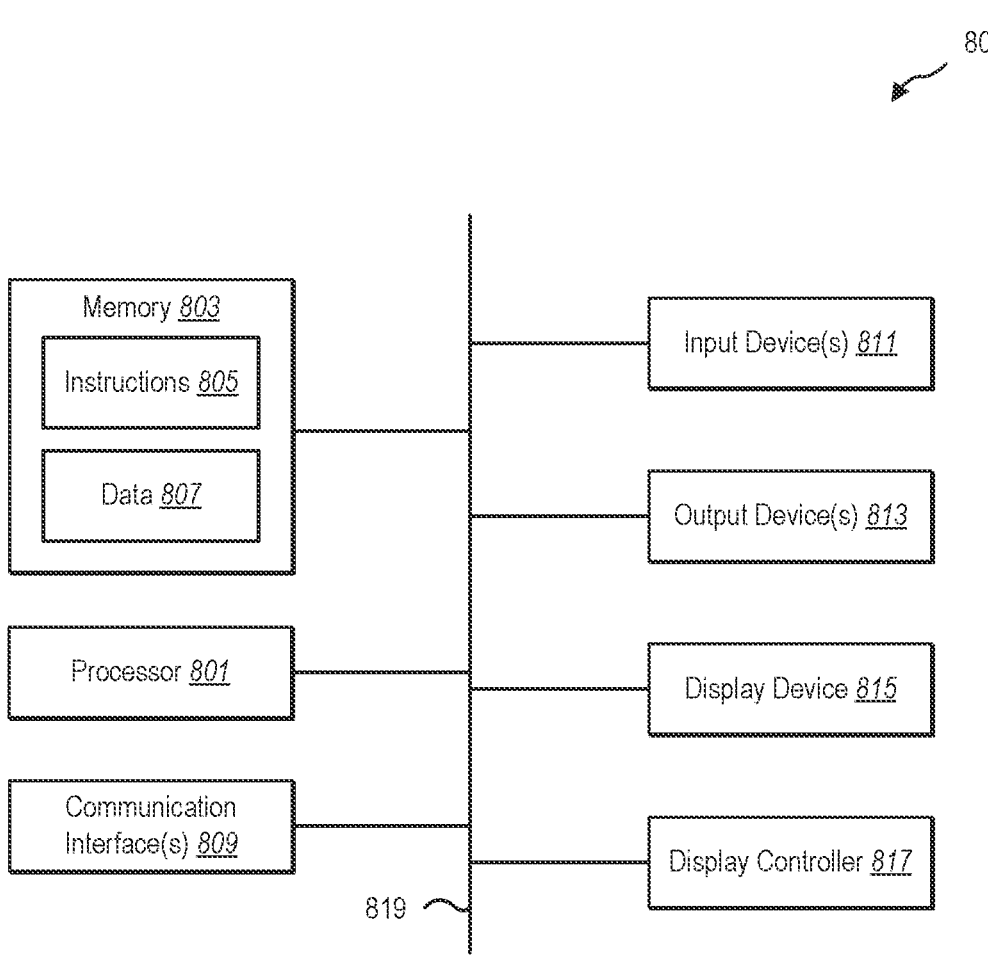
FIG. 8 illustrates certain components that may be included within a computer system.

FIG. 8 illustrates certain components that may be included within a computer system 800. The computer system 800 may be used to implement the various computing devices, components, and systems described herein.

In various implementations, the computer system 800 may represent one or more of the client devices, server devices, or other computing devices described above. For example, the computer system 800 may refer to various types of network devices capable of accessing data on a network (i.e., computer network), a cloud computing system, or another system. For instance, a client device may refer to a mobile device such as a mobile telephone, a smartphone, a personal digital assistant (PDA), a tablet, a laptop, or a wearable computing device (e.g., a headset or smartwatch). A client device may also refer to a non-mobile device such as a desktop computer, a server node (e.g., from another cloud computing system), or another non-portable device.

The computer system 800 includes a processor 801. The processor 801 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 801 may be referred to as a central processing unit (CPU). Although the processor 801 shown is just a single processor in the computer system 800 of FIG. 8, in an alternative configuration, a combination of processors (e.g., an ARM and DSP) could be used.

The computer system 800 also includes memory 803 in electronic communication with the processor 801. The memory 803 may be any electronic component capable of storing electronic information. For example, the memory 803 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers, and so forth, including combinations thereof.

The instructions 805 and the data 807 may be stored in the memory 803. The instructions 805 may be executable by the processor 801 to implement some or all of the functionality disclosed herein. Executing the instructions 805 may involve the use of the data 807 that is stored in the memory 803. Any of the various examples of modules and components described herein may be implemented, partially or wholly, as instructions 805 stored in memory 803 and executed by the processor 801. Any of the various examples of data described herein may be among the data 807 that is stored in memory 803 and used during the execution of the instructions 805 by the processor 801.

A computer system 800 may also include one or more communication interface(s) 809 for communicating with other electronic devices. The one or more communication interface(s) 809 may be based on wired communication technology, wireless communication technology, or both. Some examples of the one or more communication interface(s) 809 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 800 may also include one or more input device(s) 811 and one or more output device(s) 813. Some examples of the one or more input device(s) 811 include a keyboard, mouse, microphone, remote control device, button, joystick, trackball, touchpad, and light pen. Some examples of the one or more output device(s) 813 include a speaker and a printer. A specific type of output device that is typically included in a computer system 800 is a display device 815. The display device 815 used with implementations disclosed herein may utilize any suitable image projection technology, such as liquid crystal display (LCD), light-emitting diode (LED), gas plasma, electroluminescence, or the like. A display controller 817 may also be provided, for converting data 807 stored in the memory 803 into text, graphics, and/or moving images (as appropriate) shown on the display device 815.

The various components of the computer system 800 may be coupled together by one or more buses, which may include a power bus, a control signal bus, a status signal bus, a data bus, etc. For the sake of clarity, the various buses are illustrated in FIG. 8 as a bus system 819.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network (i.e., computer network), both perform tasks. In a distributed system environment, program modules may be located in both local and remote memory storage devices.

The techniques described herein may be implemented in hardware, software, firmware, or any combination thereof unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium including instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can include at least two distinctly different kinds of computer-readable media: non-transitory computer-readable storage media (devices) and transmission media.

As used herein, non-transitory computer-readable storage media (devices) may include RAM, ROM, EEPROM, CD-ROM, solid-state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

The steps and/or actions of the methods described herein may be interchanged with one another without departing from the scope of the claims. In other words, unless a specific order of steps or actions is required for the proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, or another data structure), ascertaining and the like. Also, "determining" can include receiving (e.g., receiving information), accessing (e.g., accessing data in a memory), and the like. Also, "determining" can include resolving, selecting, choosing, establishing, and the like.

The terms "comprising," "including," and "having" are intended to be inclusive and mean that there may be additional elements other than the listed elements. Additionally, it should be understood that references to "one implementation" or "implementations" of the present disclosure are not intended to be interpreted as excluding the existence of additional implementations that also incorporate the recited features. For example, any element or feature described concerning an implementation herein may be combinable with any element or feature of any other implementation described herein, where compatible.

The present disclosure may be embodied in other specific forms without departing from its spirit or characteristics. The described implementations are to be considered illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A computer-implemented method for facilitating network-graph exploration, comprising:

providing, within a graphical user interface, a network graph that comprises a set of nodes connected with a set of edges, wherein the network graph is a parameterized graph structure recovered from a data set utilizing a machine-learning sparse graph recovery model configured to recover a sparse graph structure by determining correlation strengths between pairs of concepts within data sets, and wherein the parameterized graph structure correlates concepts within the data set where nodes in the parameterized graph structure represent concepts extracted from the data set and edges are parameterized by correlation values learned from the data set;

receiving a modified value condition as input modifying a value of a target node from the set of nodes;

determining, for a subset of nodes that are connected to the target node, updated values based on the modified value condition and the parameterized graph structure; and providing, by updating the graphical user interface, an updated network graph that comprises the subset of nodes with the updated values.

2. The computer-implemented method of claim 1, wherein:

the updated values comprise observed values for nodes inside the set of nodes for which values have been provided by a user;

the updated values comprise updated steady-state values for nodes outside the set of nodes for which values have been received;

the updated values comprise updated conditional distributions over variables in the data set for nodes in the set of nodes for which new value conditions have not been received; and determining the updated steady-state values is further based on parameterized graph structure network parameters corresponding to the network graph.

3. The computer-implemented method of claim 1, further comprising:

determining that a graph complexity metric in the network graph exceeds a network graph complexity threshold; and based on the network graph complexity threshold being exceeded, compressing multiple nodes from the set of nodes in the network graph by combining an additional subset of nodes into a combined node until the network graph complexity threshold is no longer exceeded.

4. The computer-implemented method of claim 1, wherein the input comprises multiple modified value conditions corresponding to multiple nodes within the network graph.

5. The computer-implemented method of claim 1, further comprising generating the network graph by determining, for each node of the set of nodes, a marginal probability distribution, an expected value, and a maximum a-posteriori estimate from a joint prior probability distribution generated from sample data by the machine-learning sparse graph recovery model.

6. The computer-implemented method of claim 5, wherein determining the updated values for the subset of nodes comprises determining an updated value for a first node from the subset of nodes based on an edge connection value from the parameterized graph structure between the first node and the target node.

7. The computer-implemented method of claim 1, wherein the modified value condition comprises:

a numeric value modifying a value of the target node;

a relative numerical change to a displayed value of the target node;

a closed numerical range based on sample data corresponding to the target node from the data set; or an open numerical range based on sample data corresponding to the target node from the data set.

8. The computer-implemented method of claim 1, further comprising:

receiving additional input modifying parameters for an edge connection value between a first node and a second node of the set of nodes;

generating a first set of updated edge connection values between the first node and a first subset of nodes connected to the first node;

generating a second set of updated edge connection values between the second node and a second subset of nodes connected to the second node; and providing, by updating the graphical user interface, a further updated network graph that comprises the first set of updated edge connection values and the second set of updated edge connection values.

9. The computer-implemented method of claim 1, further comprising:

determining that the data set comprises a randomly missing sample value corresponding to a node in the network graph;

generating a new value for the randomly missing sample value based on an imputation algorithm, values of other nodes in the data set, and a joint probability distribution determined for the set of nodes;

generating an updated parameterized graph structure based on a set of samples with new imputed values; and providing, by updating the graphical user interface, a new network graph that comprises the new imputed values.

10. The computer-implemented method of claim 1, further comprising evaluating network graph quality by:

masking a random sample value in the data set corresponding to a node in the network graph such that the random sample value appears as a missing value;

generating a new value for the random sample value based on an imputation algorithm, values of other nodes in the data set and a joint probability distribution determined for nodes in the data set;

determining an error metric utilizing a regression or classification evaluation metric by comparing a new value with the random sample value; and determining a network graph quality metric for the network graph based on the error metric.

11. A system comprising:

at least one processor; and a non-transitory computer memory comprising instructions that, when executed by the at least one processor, cause the system to:

provide, within a graphical user interface, a network graph that comprises a set of nodes connected with a set of edges, wherein the network graph is a parameterized graph structure recovered from a data set utilizing a machine-learning sparse graph recovery model configured to recover a sparse graph structure by determining correlation strengths between pairs of concepts within data sets, and wherein the parameterized graph structure correlates concepts within the data set where nodes in the parameterized graph structure represent concepts extracted from the data set and edges are parameterized by correlation values learned from the data set;

receive a modified value condition as input modifying a value of a target node from the set of nodes;

determine, for a subset of nodes that are connected to the target node, updated values based on the modified value condition and the parameterized graph structure;

determine an updated joint probability distribution over nodes based on the modified value condition and the parameterized graph structure; and provide, by updating the graphical user interface, an updated network graph that comprises the subset of nodes with the updated values.

12. The system of claim 11, further comprising instructions that, when executed by the at least one processor, cause the system to:

determine that an average number of connections per node in the network graph exceeds a network graph complexity threshold; and based on the network graph complexity threshold being exceeded, compress multiple nodes from the set of nodes in the network graph by combining an additional subset of nodes into a combined node.

13. The system of claim 12, wherein combining the additional subset of nodes comprises determining that each node in the additional subset of nodes is connected to each other node in the subset of nodes.

14. The system of claim 13, wherein combining the additional subset of nodes comprises determining that each edge connection value in the additional subset of nodes matches a given constraint.

15. The system of claim 12, wherein combining the additional subset of nodes comprises determining that the additional subset of nodes is located apart from a larger node subset within the network graph.

16. The system of claim 12, wherein compressing the multiple nodes comprises generating an updated parameterized graph structure having updated edge connection values between the combined node and nodes connected to the combined node.

17. A non-transitory computer-readable storage medium comprising instructions that, when executed by at least one processor, cause a computer device to:

provide, within a graphical user interface, a network graph that comprises a set of nodes connected with a set of edges, wherein the network graph is a parameterized graph structure recovered from a data set utilizing a machine-learning sparse graph recovery model configured to recover a sparse graph structure by determining correlation strengths between pairs of concepts within data sets, and wherein the parameterized graph structure correlates concepts within the data set where nodes in the parameterized graph structure represent concepts extracted from the data set and edges are parameterized by correlation values learned from the data set:

receive a modified value condition as input modifying a value of a target node from the set of nodes;

determine, for a subset of nodes that are connected to the target node, updated values based on the modified value condition and the parameterized graph structure; and provide, by updating the graphical user interface, an updated network graph that comprises the subset of nodes with the updated values.

18. The non-transitory computer-readable storage medium of claim 17, wherein determining the updated values for the subset of nodes comprises determining an updated value for a first node from the subset of nodes based on an edge connection value from the parameterized graph structure between the first node and the target node.

19. The non-transitory computer-readable storage medium of claim 17, further comprising instructions that, when executed by the at least one processor, cause the computer device to compress multiple nodes from the set of nodes in the network graph by combining an additional subset of nodes into a combined node, wherein each node in the additional subset of nodes is connected to each other node in the subset of nodes.

20. The non-transitory computer-readable storage medium of claim 17, wherein determining the updated values for the subset of nodes comprises maintaining same edge connection values for the set of nodes in the network graph.

* * * * *